United States Patent
McDonald et al.

(10) Patent No.: US 11,302,924 B2
(45) Date of Patent: Apr. 12, 2022

(54) DUAL ELECTRON-ION CONDUCTIVE POLYMER COMPOSITE

(71) Applicant: Massachusetts Institute of Technology, Cambridge, MA (US)

(72) Inventors: Michael McDonald, Winnipeg (CA); Paula T. Hammond, Newton, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 236 days.

(21) Appl. No.: 16/342,797

(22) PCT Filed: Oct. 17, 2017

(86) PCT No.: PCT/US2017/056906
§ 371 (c)(1),
(2) Date: Apr. 17, 2019

(87) PCT Pub. No.: WO2018/075469
PCT Pub. Date: Apr. 26, 2018

(65) Prior Publication Data
US 2020/0052300 A1 Feb. 13, 2020

Related U.S. Application Data

(60) Provisional application No. 62/408,989, filed on Oct. 17, 2016.

(51) Int. Cl.
*H01M 4/62* (2006.01)
*C08L 71/02* (2006.01)
(Continued)

(52) U.S. Cl.
CPC ............. *H01M 4/622* (2013.01); *C08L 71/02* (2013.01); *H01M 4/624* (2013.01);
(Continued)

(58) Field of Classification Search
CPC ...... H01M 4/622; H01M 4/624; H01M 4/608; H01M 4/75; H01M 4/13; H01M 4/137;
(Continued)

(56) References Cited

U.S. PATENT DOCUMENTS 6,949,318 B2  9/2005  Choi et al.
7,629,079 B2  12/2009  Sada et al.
(Continued)

FOREIGN PATENT DOCUMENTS

WO  WO-2018/075469 A1  4/2018

OTHER PUBLICATIONS

Ghosh et al., "Networks of Electron-Conducting Polymer in Matrices of Ion-Conducting Polymers," 2000, Electrochemical and Solid-State Letters, 3 (5), 213-215. (Year: 2000).*
(Continued)

*Primary Examiner* — Matthew W Van Oudenaren
(74) *Attorney, Agent, or Firm* — Foley Hoag LLP; Alexander Akhiezer; Lawrence P. Tardibono

(57) ABSTRACT

The present disclosure provides a composite material comprising an electrically conductive polymer, such as poly(3,4-ethylenedioxythiophene) (PEDOT) and an ionically conductive polymer, such as poly(ethylene oxide) (PEO). This composite forms a dual conductor for three-dimensional electrodes in electrochemical applications including lithium ion batteries.

19 Claims, 12 Drawing Sheets

(51) Int. Cl.
*H01M 10/0525* (2010.01)
*H01M 10/0565* (2010.01)

(52) U.S. Cl.
CPC ... *H01M 10/0525* (2013.01); *H01M 10/0565* (2013.01); *C08L 2203/16* (2013.01); *C08L 2205/03* (2013.01); *H01M 2300/0082* (2013.01)

(58) Field of Classification Search
CPC ........... H01M 4/1399; H01M 10/0525; H01M 10/0565; H01M 2300/0082; C08L 2203/16; C08L 2205/03; C08L 71/02; C25B 11/04
See application file for complete search history.

(56) References Cited

U.S. PATENT DOCUMENTS

| | | |
|---|---|---|
| 2005/0008934 A1 | 1/2005 | Oyama et al. |
| 2008/0020280 A1 | 1/2008 | Miura et al. |
| 2008/0067972 A1* | 3/2008 | Takami ............... H01M 10/441 320/103 |
| 2014/0170455 A1* | 6/2014 | Kwon ................. H01M 10/052 429/94 |
| 2014/0315081 A1 | 10/2014 | Zhang et al. |
| 2015/0303477 A1 | 10/2015 | Lovenich et al. |

OTHER PUBLICATIONS

Das et al., "PEDOT:PSS as a Functional Binder for Cathodes in Lithium Ion Batteries," Jan. 30, 2015, Journal of the Electrochemical Society, 162 (4), A674-A678. (Year: 2015).*
Wang et al., "Effects of poly(ethylene glycol) on electrical conductivity of poly (3,4-ethylenedioxythiophene)-poly(styrenesulfonic acid) film," Jan. 29, 2005, Applied Surface Science, 250, 188-194. (Year: 2005).*
International Search Report and Written Opinion for International Application No. PCT/US2017/056906 dated Dec. 18, 2017.
Abraham., "Prospects and Limits of Energy Storage in Batteries," The Journal of Physical Chemistry Letters, 6(5): 830-844 (2015).
Albery et al., "Spectroscopic and electrochemical studies of charge transfer in modified electrodes," Faraday Discussion of the Chemical Society, 88: 247-259 (1989).
Bartolotta et al., "The fusion of ethylene oxide polymers," IL Nuovo Cimento D, 16: 825-830 (1994).
Buckley et al., "Melting behaviour of low molecular weight poly (ethylene-oxide) fractions," Colloid and Polymer Science, 254: 695-715 (1976).
Chen et al., "High capacity and cyclic performance in a three-dimensional composite electrode filled with inorganic solid electrolyte," Journal of Power Sources, 249: 306-310 (2014).
Cho et al., "Nanonets: Hetero-Nanonet Rechargeable Paper Batteries: Toward Ultrahigh Energy Density and Origami Foldability," Advanced Functional Materials, 25(38): 6029-6040 (2015).
Crispin et al., "The Origin of the High Conductivity of Poly(3,4-ethylenedioxythiophene)-Poly(styrenesulfonate) (PEDOT-PSS) Plastic Electrodes," Chemistry of Materials, 18: 4354-4360 (2006).
Debiemme-Chouvy et al., "An insight into the overoxidation of polypyrrole materials," Electrochemistry Communications, 10(6): 947-950 (2008).
Dunn et al., "Electrical Energy Storage for the Grid: A Battery of Choices," Science, 334(6058): 928-935 (2011).
Etacheri et al., "Challenges in the development of advanced Li-ion batteries: a review," Energy & Environmental Science, 4: 3243 (2011).
Fergus., "Ceramic and polymeric solid electrolytes for lithium-ion batteries," Journal of Power Sources, 195(15): 4554-4569 (2010).
Fu et al., "Surface modifications of electrode materials for lithium ion batteries," Solid State Sciences, 8(2): 113-128 (2006).
Gnanamuthu et al., "Electrochemical properties of Super P carbon black as an anode active material for lithium-ion batteries," Materials Chemistry and Physics, 130(3): 831-834 (2011).
Goodenough et al., "Challenges for Rechargeable Li Batteries," Chemistry of Materials, 22(3): 587-603 (2010).
Gwon et al., "Recent progress on flexible lithium rechargeable batteries," Energy & Environmental Science, 7: 538-551 (2014).
Hallinan et al., "Polymer Electrolytes," Annual Reviews of Materials Research, 43: 503-525 (2013).
Higgins et al., "A Commercial Conducting Polymer as Both Binder and Conductive Additive for Silicon Nanoparticle-Based Lithium-Ion Battery Negative Electrodes," ACS Nano, 10(3): 3702-3713 (2016).
Hillman et al., "Kinetics and mechanism of the electrochemical p-doping of PEDOT," Electrochemistry Communications, 9(6): 1316-1322 (2007).
Hopkins et al., "Crystallization Driven Formation of Conducting Polymer Networks in Polymer Blends," Macromolecules, 33(14): 5221-5226 (2000).
Huang et al., "Chemical cross-linking of conducting poly(3,4-ethylenedioxythiophene):poly(styrenesulfonate)(PEDOT:PSS) using poly(ethylene oxide) (PEO)," Polymer, 54(23): 6455-6462 (2013).
N. Balasubramanian, review of Lithium Batteries: Science and Technology, ed. Julien et al., Springer International, Switzerland (2016). MRS Bulletin, 41:707 (2016).
Kang et al., "Battery materials for ultrafast charging and discharging," Nature, 458: 190-193 (2009).
Lang et al., "Microscopical Investigations of PEDOT:PSS Thin Films," Advanced Functional Materials, 19(8): 1215-1220 (2009).
Lefebvre et al., "Chemical Synthesis, Characterization, and Electrochemical Studies of Poly(3,4-ethylenedioxythiophene)/Poly(styrene-4-sulfonate) Composites," Chemistry of Materials, 11(2): 262-268 (1999).
Li et al., "Modeling the SEI-Formation on Graphite Electrodes in LiFePO4 Batteries," Journal of the Electrochemical Society, 162: A858-A869 (2015).
Liu et al., "Advanced Materials for Energy Storage," Advanced Materials, 22(8): E28-E62 (2010).
Liu et al., "Highly transparent mixed electron and proton conducting polymer membranes," Journal of Materials Chemistry, 22: 15534-15539 (2012).
Liu et al., "Polymers with Tailored Electronic Structure for High Capacity Lithium Battery Electrodes," Advanced Materials, 23(40): 4679-4683 (2011).
McDonald et al., "Efficient Transport Networks in a Dual Electron/Lithium-Conducting Polymeric Composite for Electrochemical Applications," ACS Applied Materials & Interfaces, 10: 15681-15690 (2018).
Mengistie et al., "Effect of molecular weight of additives on the conductivity of PEDOT:PSS and efficiency for ITO-free organic solar cells," Journal of Materials Chemistry A, 1: 9907-9915 (2013).
Ngai et al., "A review of polymer electrolytes: fundamental, approaches and applications," Ionics, 22: 1259-1279 (2016).
Ouyang et al., "On the mechanism of conductivity enhancement in poly(3,4-ethylenedioxythiophene):poly(styrene sulfonate) film through solvent treatment," Polymer, 45(25): 8443-8450 (2004).
Pickup., "Alternating current impedance study of a polypyrrole-based anion-exchange polymer," Journal of the Chemical Society Faraday Transactions, 86(21): 3631-3636 (1990).
Quartarone et al., "PEO-based composite polymer electrolytes," Solid State Ionics, 110(1-2): 1-14 (1998).
Ren et al., "Review of electrical energy storage system for vehicular applications," Renewable and Sustainable Energy Reviews, 41: 225-236 (2015).
Sanchez-Soto et al., "Effect of Molecular Mass on the Melting Temperature, Enthalpy and Entropy of Hydroxy-Terminated PEO," Journal of Thermal Analysis and Calorimetry, 67(1): 189-197 (2002).
Shao et al., "Water-Soluble Conductive Composite Binder Containing PEDOT:PSS as Conduction Promoting Agent for Si Anode of Lithium-Ion Batteries," ChemElectroChem, 1(10): 1679-1687 (2014).

(56) References Cited

OTHER PUBLICATIONS

Spahr et al., "Development of carbon conductive additives for advanced lithium ion batteries," Journal of Power Sources, 196(7): 3404-3413 (2011).

Wang et al., "Effects of poly(ethylene glycol) on electrical conductivity of poly(3,4-ethylenedioxythiophene)-poly(styrenesulfonic acid) film," Applied Surface Science, 250(1-4): 188-194 (2005).

Wang et al., "Solubilization of Carbon Nanotubes by Nafion toward the Preparation of Amperometric Biosensors," Journal of the American Chemical Society, 125(9): 2408-2409 (2003).

Wu et al., "Toward an Ideal Polymer Binder Design for High-Capacity Battery Anodes," Journal of the American Chemical Society, 135(32): 12048-12056 (2013).

Xu et al., "The effect of different binders on electrochemical properties of LiNi1/3Mn1/3Co1/3O2 cathode material in lithium ion batteries," Journal of Power Sources, 225: 172-178 (2013).

Zhang et al., "Percolation threshold of graphenenanosheets as conductive additives in Li4Ti5O12 anodes of Li-ion batteries," Nanoscale, 5: 2100-2106 (2013).

Zheng et al., "A comprehensive understanding of electrode thickness effects on the electrochemical performances of Li-ion battery cathodes," Electrochimica Acta, 71: 258-265 (2012).

Zheng et al., "Cooperation between Active Material, Polymeric Binder and Conductive Carbon Additive in Lithium Ion Battery Cathode," The Journal of Physical Chemistry C, 116(7): 4875-4882 (2012).

Zhou et al., "The temperature-dependent microstructure of PEDOT/PSS films: insights from morphological, mechanical and electrical analyses," Journal of Materials Chemistry C, 2: 9903 (2014).

Zhou et al., "Unraveling the Order and Disorder in Poly(3,4-ethylenedioxythiophene)/Poly(styrenesulfonate) Nanofilms," Macromolecules, 48(16): 5688-5696 (2015).

Zykwinska et al., "Electrochemical overoxidation of poly(3,4-ethylenedioxythiophene)-PEDOT studied by means of in situ ESR spectroelectrochemistry," Electrochimica Acta, 50(7-8): 1625-1633 (2005).

\* cited by examiner

DUAL ELECTRON-ION CONDUCTIVE POLYMER COMPOSITE

This application is a 371 U.S. National stage application of PCT/US17/56906, filed on Oct. 17, 2017, which claims the benefit of priority to U.S. Provisional Application 62/408,989 filed on Oct. 17, 2016. The entire contents of these applications are incorporated herein by reference in their entirety.

BACKGROUND

Electrochemical technologies, such as those for production of value-added chemicals (e.g. $CH_3OH$ from $CO_2$ reduction and $H_2$ from electrolysis of $H_2O$) and especially energy storage (e.g. batteries and fuel cells), require innovations that improve portability, energy efficiency/capability and cost. The use of electrochemical approaches has become increasingly important, advanced by batteries utilized in mobile telephones and laptop computers, and emerging applications in electric vehicles and the renewable energy grid. To meet the growing demands of electrochemical devices, there is a need to advance the various material components that facilitate the movement of charges throughout them.

SUMMARY OF THE INVENTION

In one aspect, the present invention is a composite material for an electrode. The composite material comprises a polymer matrix. The polymer matrix comprises a first phase, the first phase comprising an electrically conductive polymer, wherein the first phase is substantially continuous; and a second phase, the second phase comprising an ion-conducting polymer.

In another aspect, the present invention is an electrode comprising a collector; and the composite material as described herein, in electrical contact with a surface of the collector.

In another aspect, the present invention is an electrochemical energy storage device, comprising the composite material or the electrode described herein.

BRIEF DESCRIPTION OF THE DRAWINGS

FIG. 3A shows PEDOT:PSS. FIG. 3B shows a PEO:PEDOT 4:1 (25 wt %) composite. FIG. 3C shows a PEO:PEDOT 20:1 (64 wt %) composite. FIG. 3D shows a PEO:PEDOT 85:1 (89 wt %) composite. The thick black lines in the TEM images are the lacey carbon grid upon which sample slices are suspended.

DETAILED DESCRIPTION OF THE INVENTION

Figure 1A:
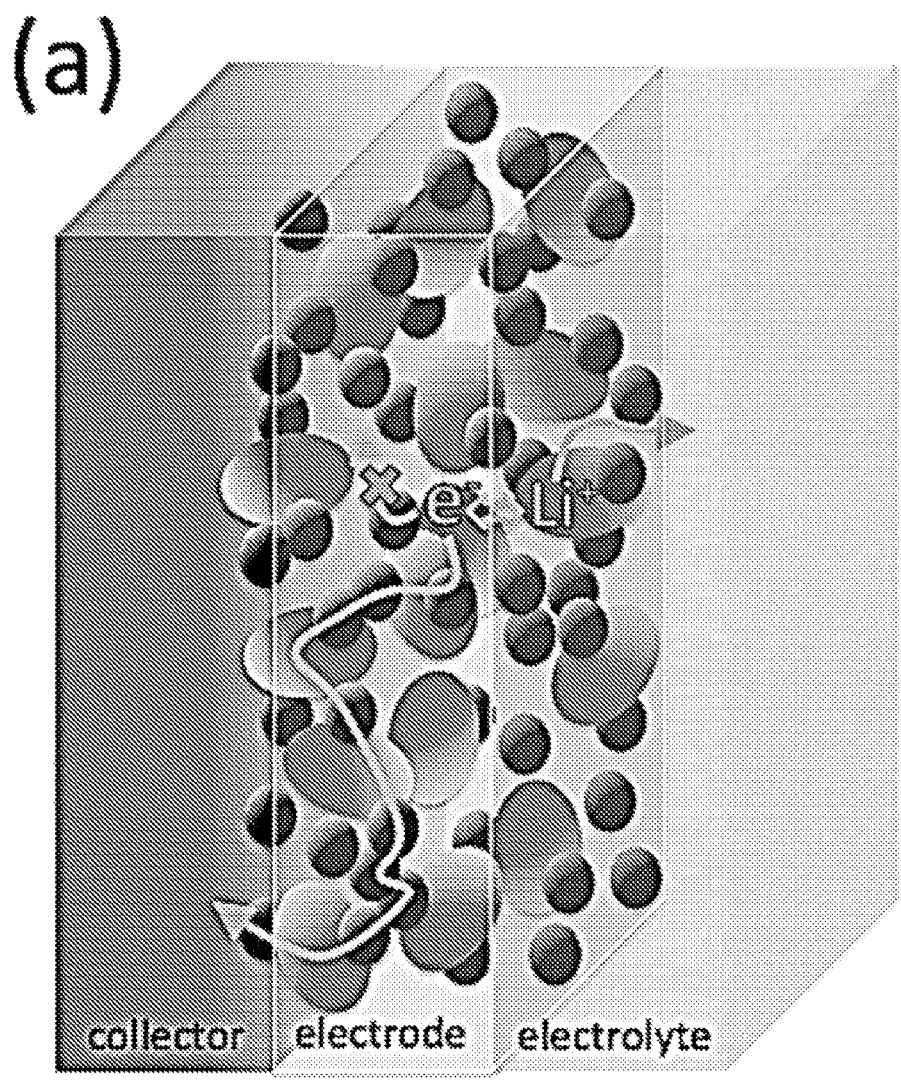
FIG. 1A is a schematic diagram of a conventional Lithium ion battery (LIB) electrode containing storage material particles (larger, grey ovoids) and conductive carbon particles (smaller, black circles) in a polymer binder. Electrons and Li ions move between the storage material, and collector and electrolyte, respectively. Electron transport relies on pathways randomly formed between conductive carbon particles.

In one aspect, the present invention is a composite material for an electrode. The composite material comprises a polymer matrix. The polymer matrix comprises a first phase, the first phase including an electrically conductive polymer, wherein the first phase is substantially continuous; and a second phase, the second phase including an ion-conducting polymer. In certain embodiments, the first phase is continuous. In certain embodiments, the second phase is substantially continuous, or is continuous.

In certain embodiments of the composite material, the electrically conductive polymer is poly(3,4-ethylenedioxythiophene) (PEDOT) or a derivative thereof. For example, the electrically conductive polymer may be a polymer comprising a repeat unit according to formula (I):

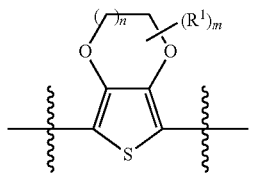

wherein:
n is 0, 1, 2, or 3;
m is 1, 2, 3, or 4; and
each instance of $R^1$ is selected from a $C_1$-$C_{20}$ alkyl optionally substituted with hydroxy. In certain embodiments, the electrically conductive polymer is a homopolymer of formula (I). In certain embodiments, the electrically conductive polymer is a heteropolymer of formula (I). In certain embodiments, the electrically conductive polymer is PEDOT, poly 2,3-dihydrothieno[3,4][1,4]dioxin-2-yl methanol (PEDOT-CH$_2$—OH), or poly 3,4-dihydro-2H-thieno[3,4-b][1,4]dioxepin-3-01 (PropOT), or a derivative thereof. In certain embodiments, the electrically conductive polymer is PEDOT. The remaining elements of the composite material may be selected as described below.

In certain embodiments of the composite material, the ionically conductive polymer is poly(ethylene glycol) (PEG, also referred to herein as polyethylene oxide, or PEO) or a poly(propylene glycol) (PPG, also referred to herein as a polypropylene oxide or PPO), or a derivative thereof. For example, the ionically conductive polymer may be a polymer comprising a repeat unit according to formula (II):

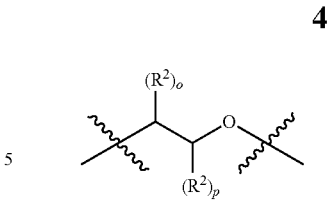

wherein:
o is 0, 1, or 2;
p is 0, 1, or 2;
each instance of $R^2$ is selected from a $C_1$-$C_{20}$ alkyl optionally substituted with hydroxy. In certain embodiments, the ionically conductive polymer is PEO or PPO. In certain embodiments, the ionically conductive polyer is PEO. The remaining elements of the composite material may be selected as described above and below.

In certain embodiments, the composite material further comprises a surfactant, such as a polymeric surfactant. In certain embodiments, the surfactant is poly(styrene sulfonate) (PSS). The remaining elements of the composite material may be selected as described above and below.

In certain embodiments, the composite material further comprises a particulate active material. In certain embodiments, the active material is selected from a cathodic active material or an anodic active material. In certain embodiments, the active material comprises lithium metal or lithium compound. In certain embodiments, the active material is lithium cobalt oxide (LCO), lithium nickel cobalt manganese oxide (NCM), lithium nickel cobalt aluminum oxide (NCA), lithium iron phosphate (LFP), lithium titanium oxide (LTO), a lithium alloy, a lithium chalcogenide, a lithium halide, or a lithium polyanion. In certain embodiments, the active material comprises silicon or carbon. The remaining elements of the composite material may be selected as described above and below.

In certain embodiments, the composite material comprises PEDOT, PEO, and PSS. In certain embodiments, the PEDOT is in the first phase, and the PEO and PSS are in the second phase. In certain embodiments, the molar ratio of PEO to PEDOT based on monomer content is between about 1:1 and 300:1. In certain embodiments, the molar ratio of PEO to PEDOT based on monomer content is between about 10:1 and 85:1. In certain embodiments, the molar ratio of PEO to PEDOT based on monomer content is about 20:1. The remaining elements of the composite material may be selected as described above.

In certain aspects, the present disclosure provides electrodes, e.g. for an electrochemical energy storage device, comprising a collector; and further comprising a composite material as described above, wherein the composite material is in electrical contact with a first surface of the collector.

In certain embodiments of the electrode, the layer of the composite material is disposed in a layer on the first surface of the collector. In certain embodiments of the electrode, the layer has a thickness relative to the first surface of the collector of at least 10 μm, at least 20 μm, at least 40 μm, at least 60 μm, at least 80 μm, or at least 100 μm. In certain embodiments, the layer has a thickness relative to the first surface of the collector of 10-1000 μm, 20-1000 μm, 40-1000 μm, 60-1000 μm, 80-1000 μm, or 100-1000 μm. In certain embodiments, the layer has a thickness relative to the first surface of the collector of 10-800 μm, 10-600 μm, 10-400 μm, 10-200 μm, or 10-100 μm. In certain embodiments, the collector has a major surface, for example, the collector may comprise a planar structure, and the layer thickness is measured perpendicular to the surface of the collector. Such embodiments include those where the collector comprises a planar structure that is folded or otherwise manipulated to occupy a smaller three-dimensional space, for example the planar portion of the collector may be rolled into a cylindrical shape, wherein the layer of composite is disposed on the collector such that, once rolled, the composite is layered between surfaces of the collector.

In certain embodiments, the collector is partially disposed within the composite material. In certain embodiments, the collector is a wire.

In certain aspects, the present disclosure provides electrochemical energy storage devices comprising a composite material or electrode as described herein.

General Considerations

To meet the growing demands of electrochemical devices, there is a need to advance the various material components that facilitate the movement of charges throughout them. In addition to enhancing the intrinsic conductivities of the components contained in the electrode and electrolyte, the number and composition of non-active components in a cell should be minimized. In particular, an electrode that is three-dimensional (thick) requires efficient transport of both electrons and ions, unlike the electrolyte and electric circuit components. Examples of this requirement are present in such systems as proton exchange membrane fuel cells (PEMFCs), where several different layers comprise the electrode and incorporate the gas diffusion and catalytic (active) components using nanostructured conductive carbon-proton exchange polymer components at the electrode-electrolyte interface for electron and ion transport respectively. Here, this non-catalytic component is essentially a dual electron/proton conductor, without which the electrode kinetics would be severely limited.

While the PEMFC interface has been extensively innovated to provide transport of both electrons and ions to meet kinetic rate requirements, three-dimensional electrodes are also desirable for lithium-based battery technology, such as the lithium-ion battery (LIB), which is selected to power the vast majority of emerging portable electronics due to its high energy density and excellent rechargeability properties. The active component in an LIB is the storage material (e.g., graphite, $LiCoO_2$, $LiFePO_4$, $LiNiMnCoO_2$) in the electrodes, which holds and releases charge via intercalation/deintercalation of $Li^+$. The combination of the anode and cathode storage materials selected will determine performance characteristics; however, LIB storage materials are generally resistive to electron and lithium ion transport. Electrodes composed entirely of storage materials are therefore not possible, and so the storage materials must be in particulate form in a conductive-structural matrix to permit short diffusion lengths for electrons and ions between intercalation/deintercalation and collection (FIG. 1A). Since the binder is necessary for effective charge transport, it determines power density, but also adds inactive mass, and thus controls energy density (capacity).

In LIBs and other similar electrode systems, electronic conductivity is usually achieved through conductive carbon (CC) additives which, at sufficient concentrations (5-30 wt %), form a critical number of percolative pathways. These CC additives, along with the active storage material particles, are suspended in a structural binder, often an inert polymer. This polymer binder adds inactive mass and also blocks CC transport pathways. Because the pathways are limited by length, efficient transport is ensured by casting thin layers of slurry containing all components on metal foil current collectors. Ionic conductivity is gained via the wetting of porous regions of the electrode with liquid electrolyte, and is often limited by the electrode morphology.

The limitations of this conventional approach to access the active portion of electrodes present an opportunity to integrate new electron- and ion-conducting materials in place of conductive carbon-inert polymer composites. To reduce the number of components, an ideal material will possess dual conductivity (e.g. transporting both electrons and $Li^+$), as well as adhesive properties to bind active material particulates, in a single material. Thus, CC particles would not be required, and the use of foil-based collectors could be limited (e.g., thicker layers of electrode material could be deposited on the foil), or the use of foil could be avoided altogether in favor of collectors, such as wire-based collectors, that are placed within the material. However, materials with appropriate properties are not currently known.

Electrically Conductive Polymers

Figure 1B:
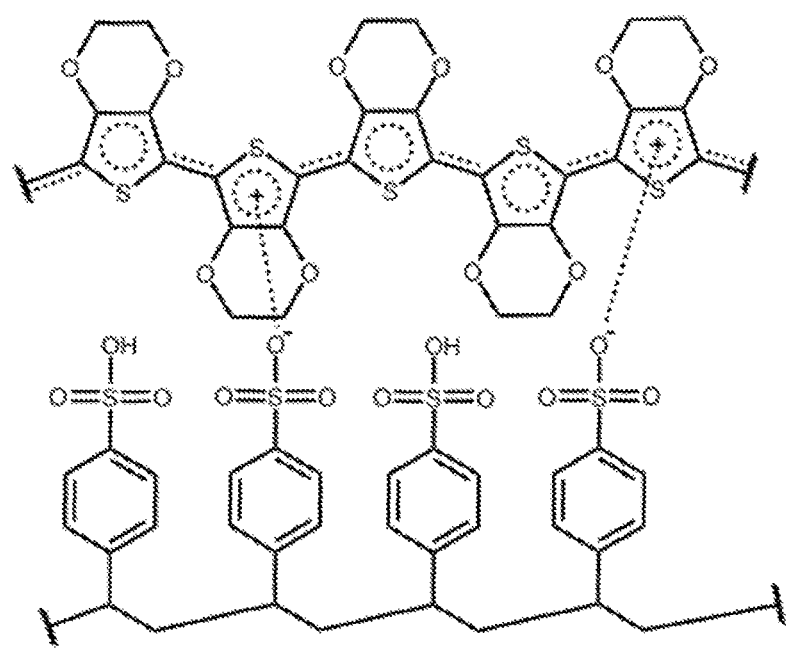
FIG. 1B shows the chemical structure of PEDOT:PSS complex.

Many types of electronically conductive polymers are known. Poly(3,4-ethylenedioxythiophene) (PEDOT) is the most attractive due to its excellent conductivity, chemical stability, and processability. PEDOT is commercially available in an aqueous dispersion with poly(4-styrenesulfonic acid) (PSS) (FIG. 1B), which helps solubilize PEDOT and compensates its charged backbone. PEDOT:PSS has recently been studied as a functional binder in LIB electrodes, and was shown to decrease the porosity of the electrode (inactive space between storage material particles) and the cell overpotential for lithium intercalation/deintercalation, enhancing rate capability (~80% at 5 C). This system outperformed the conventional CC/polyvinylidene fluoride (PVDF), a result of the longer-range, continuous conductive networks formed from a polymer. Unlike CC particles that are incorporated based on percolation thresholds, conductive polymers make up most of the bulk of conductive binders, leading to continuous charge pathways throughout the material.

Ionically Conductive Polymers

Figure 1C:
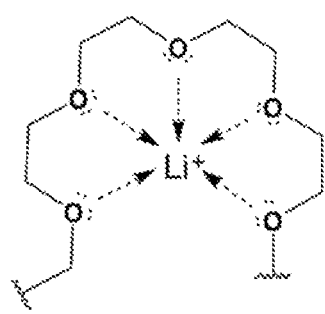
FIG. 1C shows the chemical structure of PEO with oxygen lone electron pairs interacting with Li ions.

Specific $Li^+$ transport is typically ignored in both battery electrode binders as well as dual conductors as a whole. This can also be specifically addressed in a functional binder using polymers. Polyethylene oxide (PEO, FIG. 1C) is the most widely studied $Li^+$ conductive polymer for lithium battery solid state electrolytes. Its conductivity in the amorphous state arises from ion-dipole interactions between $Li^+$ and lone pair electrons on PEO oxygen, along with its flexible chains that allow ion mobility.

Electrically and Ionically Conductive Composite

The composite materials disclosed herein contain both electrically and ionically conductive polymers in separate, but intimately associated phases, and surprisingly exhibit enhanced conductivity over the individual components. These composites, for example comprising quantities of PEO combined with PEDOT:PSS, form a dual conductive, all-polymer, aqueous-processable composite for applications requiring both electronic and $Li^+$ conductivity, as well as mechanical properties including adhesion, structure and flexibility, for use in devices such as lithium-based battery electrodes. The development of this material concept allows the binder-active material ratio to be minimized while also improving electron and ion transport properties simultaneously to enhance energy density, power density and cyclability in electrochemical systems.

As further described in the present disclosure, the electronically conductive polymer system PEDOT:PSS may be combined with the lithium ion conductive polymer PEO by mixing and casting aqueous solutions at ambient conditions to form composites of varying PEDOT-PEO ratios. The dual conductor exhibits greatly enhanced transport properties, both electrically and ionically, with the addition of large loadings (up to 89 wt %) of PEO. This particular combination of polymers is optimal at the 20:1 PEO:PEDOT monomer ratio (64 wt % PEO), where electronic conductivity is approximately 45 S·cm$^{-1}$ and Li$^+$ conductivity is ~10$^{-4}$ S·cm$^{-1}$ (increases of 2 orders of magnitude and 8 fold, respectively, compared to pristine PEDOT:PSS). The Li$^+$ conductivity is comparable to other lithium-based polymer electrolytes at room temperature. These conditions are also improved 2.5 orders of magnitude compared to a conventional binder system for electron transport. TEM, AFM, DSC, and WAXD were used to expose the structure-function relationship, and it was found that PEO and PSS interact strongly and drive the formation of better-aligned and grouped PEDOT networks such that they form more efficient pathways throughout the bulk material despite their decreasing concentration as PEO is added, giving to the enhanced electronic conductivity. PSS in turn suppresses PEO crystallization, leading to enhanced Li$^+$ conductivity. The system is optimal near the saturation point, where excess PEO begins to crystallize, disrupting this unique morphology.

The electrochemical properties of the PEO:PSS:PEDOT composite were investigated in lithium cells from 1.5 V to 5 V, and it was found that the degradative processes that occur to polymers in high-potential environments are not detrimental to transport functions, with high faradaic efficiencies maintained and CV showing lower charge transfer overpotential due to improved ion and electron transport properties.

In terms of electrochemical device applications, the improved ionic and electronic conductivity can potentially increase power density and energy density. With more efficient charge transport compared to conventional binder materials, and all functionality combined into a single material, less binder would be needed to achieve the required conductivity and so the proportion of active mass can be increased. Because the fabrication is a simple addition of components into a processable, aqueous solution, this is an attractive alternative to toxic processing solvents such as NMP and vigorous dispersion procedures that are costly and more time consuming. When combining with active materials, the presence of PSS may also have dispersion qualities due to its surfactant nature to prevent agglomeration and maximize surface area in three-dimensional electrodes.

Polymers are already studied heavily for the LIB electrolyte to produce all-solid systems, so it is reasonable that polymer-based electrodes will form favorable interfaces for charge transport. Additionally, other desirable features of polymers such as flexibility may provide the ability to adapt to many modules and configurations (e.g. wearables and unique folding for improved packing efficiency). Lastly, the improved transport could enable thicker architectures, which would further increase energy density with less loss of power density.

Definitions

Unless otherwise defined herein, scientific and technical terms used in this application shall have the meanings that are commonly understood by those of ordinary skill in the art. Generally, nomenclature used in connection with, and techniques of, chemistry described herein, are those well-known and commonly used in the art.

The term "acyl" is art-recognized and refers to a group represented by the general formula hydrocarbylC(O)—, such as alkylC(O)—.

The term "acylamino" is art-recognized and refers to an amino group substituted with an acyl group and may be represented, for example, by the formula hydrocarbylC(O) NH—.

The term "acyloxy" is art-recognized and refers to a group represented by the general formula hydrocarbylC(O)O—, such as alkylC(O)O—.

The term "alkoxy" refers to an alkyl group, having an oxygen attached thereto. Representative alkoxy groups include methoxy, trifluoromethoxy, ethoxy, propoxy, tert-butoxy and the like.

The term "alkoxyalkyl" refers to an alkyl group substituted with an alkoxy group and may be represented by the general formula alkyl-O-alkyl.

The term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Typically, a straight chained or branched alkenyl group has from 1 to about 20 carbon atoms, such as from 1 to about 10 unless otherwise defined. Such substituents may occur on one or more carbons that are included or not included in one or more double bonds. Moreover, such substituents include all those contemplated for alkyl groups, as discussed below, except where stability is prohibitive. For example, substitution of alkenyl groups by one or more alkyl, carbocyclyl, aryl, heterocyclyl, or heteroaryl groups is contemplated.

An "alkyl" group or "alkane" is a straight chained or branched non-aromatic hydrocarbon which is completely saturated. Typically, a straight chained or branched alkyl group has from 1 to about 20 carbon atoms, such as from 1 to about 10 unless otherwise defined. Examples of straight chained and branched alkyl groups include methyl, ethyl, n-propyl, iso-propyl, n-butyl, sec-butyl, tert-butyl, pentyl, hexyl, pentyl and octyl.

Moreover, the term "alkyl" as used throughout the specification, examples, and claims is intended to include both "unsubstituted alkyls" and "substituted alkyls", the latter of which refers to alkyl moieties having substituents replacing a hydrogen on one or more substitutable carbons of the hydrocarbon backbone. Such substituents, if not otherwise specified, can include, for example, a halogen (e.g., fluoro), a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In certain embodiments, the substituents on substituted alkyls are selected from C$_{1-6}$ alkyl, C$_{3-6}$ cycloalkyl, halogen, carbonyl, cyano, or hydroxyl. In more particular embodiments, the substituents on substituted alkyls are selected from fluoro, carbonyl, cyano, or hydroxyl. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CF$_3$, —CN and the like. Exemplary substituted alkyls are described below. Cycloalkyls can be further substituted with alkyls, alkenyls, alkoxys, alkylthios, aminoalkyls, carbonyl-substituted alkyls, —CF$_3$, —CN, and the like.

The term "C$_{x-y}$" when used in conjunction with a chemical moiety, such as, acyl, acyloxy, alkyl, alkenyl, alkynyl, or alkoxy is meant to include groups that contain from x to y carbons in the chain. For example, the term "C$_{x-y}$ alkyl" refers to substituted or unsubstituted saturated hydrocarbon groups, including straight-chain alkyl and branched-chain alkyl groups that contain from x to y carbons in the chain, including haloalkyl groups. In certain embodiments, haloalkyl groups include trifluoromethyl, difluoromethyl, 2,2,2-trifluoroethyl, and pentafluoroethyl. C$_0$ alkyl indicates a hydrogen where the group is in a terminal position, a bond if internal. The terms "C$_{2-y}$ alkenyl" and "C$_{2-y}$ alkynyl" refer to substituted or unsubstituted unsaturated aliphatic groups analogous in length and possible substitution to the alkyls described above, but that contain at least one double or triple bond respectively.

The term "alkylamino", as used herein, refers to an amino group substituted with at least one alkyl group.

The term "alkylthio", as used herein, refers to a thiol group substituted with an alkyl group and may be represented by the general formula alkylS—.

The term "arylthio", as used herein, refers to a thiol group substituted with an alkyl group and may be represented by the general formula arylS—.

The term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Typically, a straight chained or branched alkynyl group has from 1 to about 20 carbon atoms, such as from 1 to about 10 unless otherwise defined. Such substituents may occur on one or more carbons that are included or not included in one or more triple bonds. Moreover, such substituents include all those contemplated for alkyl groups, as discussed above, except where stability is prohibitive. For example, substitution of alkynyl groups by one or more alkyl, carbocyclyl, aryl, heterocyclyl, or heteroaryl groups is contemplated.

The term "amide", as used herein, refers to a group

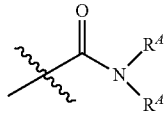

wherein each R$^A$ independently represent a hydrogen or hydrocarbyl group, or two R$^A$ are taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

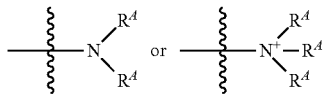

wherein each R$^A$ independently represents a hydrogen or a hydrocarbyl group, or two R$^A$ are taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. In certain embodiments the ring is a 6- or 20-membered ring, such as a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

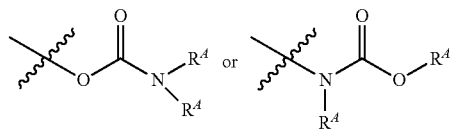

wherein each R$^A$ independently represent hydrogen or a hydrocarbyl group, such as an alkyl group, or both R$^A$ taken together with the intervening atom(s) complete a heterocycle having from 4 to 8 atoms in the ring structure.

The terms "carbocycle", and "carbocyclic", as used herein, refers to a saturated or unsaturated ring in which each atom of the ring is carbon. In certain embodiments, a carbocyclic group has from 3 to 20 carbon atoms. The term carbocycle includes both aromatic carbocycles and non-aromatic carbocycles. Non-aromatic carbocycles include both cycloalkane rings, in which all carbon atoms are saturated, and cycloalkene rings, which contain at least one double bond. "Carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

A "cycloalkyl" group is a cyclic hydrocarbon which is completely saturated. "Cycloalkyl" includes monocyclic and bicyclic rings. In certain embodiments, a cycloalkyl group has from 3 to 20 carbon atoms. Typically, a monocyclic cycloalkyl group has from 3 to about 10 carbon atoms, more typically 3 to 8 carbon atoms unless otherwise defined. The second ring of a bicyclic cycloalkyl may be selected from saturated, unsaturated and aromatic rings. Cycloalkyl includes bicyclic molecules in which one, two or three or more atoms are shared between the two rings. The term "fused cycloalkyl" refers to a bicyclic cycloalkyl in which each of the rings shares two adjacent atoms with the other ring. The second ring of a fused bicyclic cycloalkyl may be selected from saturated, unsaturated and aromatic rings. A "cycloalkenyl" group is a cyclic hydrocarbon containing one or more double bonds.

The term "carbocyclylalkyl", as used herein, refers to an alkyl group substituted with a carbocycle group.

The term "carbonate", as used herein, refers to a group —OCO$_2$—R$^A$, wherein R$^A$ represents a hydrocarbyl group.

The term "carboxy", as used herein, refers to a group represented by the formula —CO$_2$H.

The term "ester", as used herein, refers to a group —C(O)OR$^A$ wherein R$^A$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The term "heteroalkyl", as used herein, refers to a saturated or unsaturated chain of carbon atoms and at least one heteroatom, wherein no two heteroatoms are adjacent.

The terms "heteroaryl" and "hetaryl" include substituted or unsubstituted aromatic single ring structures, such as 5- to 20-membered rings, for example 5- to 6-membered rings, whose ring structures include at least one heteroatom, such one to four heteroatoms, for example one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. In certain embodiments, heteroatoms are nitrogen, oxygen, and sulfur.

The terms "heterocyclyl", "heterocycle", and "heterocyclic" refer to substituted or unsubstituted non-aromatic ring structures, such as 3- to 20-membered rings, for example 3- to 7-membered rings, whose ring structures include at least one heteroatom, such as one to four heteroatoms, for example one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "heterocyclylalkyl", as used herein, refers to an alkyl group substituted with a heterocycle group.

The term "hydrocarbyl", as used herein, refers to a group that is bonded through a carbon atom, wherein that carbon atom does not have a =O or =S substituent. Hydrocarbyls may optionally include heteroatoms. Hydrocarbyl groups include, but are not limited to, alkyl, alkenyl, alkynyl, alkoxyalkyl, aminoalkyl, aralkyl, aryl, aralkyl, carbocyclyl, cycloalkyl, carbocyclylalkyl, heteroaralkyl, heteroaryl groups bonded through a carbon atom, heterocyclyl groups bonded through a carbon atom, heterocyclylakyl, or hydroxyalkyl. Thus, groups like methyl, ethoxyethyl, 2-pyridyl, and trifluoromethyl are hydrocarbyl groups, but substituents such as acetyl (which has a =O substituent on the linking carbon) and ethoxy (which is linked through oxygen, not carbon) are not.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are six or fewer non-hydrogen atoms in the substituent. A "lower alkyl", for example, refers to an alkyl group that contains six or fewer carbon atoms. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, such as from 5 to 7.

In the phrase "poly(meta-phenylene oxides)", the term "phenylene" refers inclusively to 6-membered aryl or 6-membered heteroaryl moieties. Exemplary poly(meta-phenylene oxides) are described in the first through twentieth aspects of the present disclosure.

The term "silyl" refers to a silicon moiety with three hydrocarbyl moieties attached thereto.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. Moieties that may be substituted can include any appropriate substituents described herein, for example, acyl, acylamino, acyloxy, alkoxy, alkoxyalkyl, alkenyl, alkyl, alkylamino, alkylthio, arylthio, alkynyl, amide, amino, aminoalkyl, aralkyl, carbamate, carbocyclyl, cycloalkyl, carbocyclylalkyl, carbonate, ester, ether, heteroaralkyl, heterocyclyl, heterocyclylalkyl, hydrocarbyl, silyl, sulfone, or thioether. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In certain embodiments, the substituents on substituted alkyls are selected from $C_{1-6}$ alkyl, $C_{3-6}$ cycloalkyl, halogen, carbonyl, cyano, or hydroxyl. In particular embodiments, the substituents on substituted alkyls are selected from fluoro, carbonyl, cyano, or hydroxyl. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

The term "sulfonate" is art-recognized and refers to the group $SO_3H$, or a pharmaceutically acceptable salt thereof.

The term "sulfone" is art-recognized and refers to the group $—S(O)_2—R^A$, wherein $R^A$ represents a hydrocarbyl.

The term "thioether", as used herein, is equivalent to an ether, wherein the oxygen is replaced with a sulfur.

The present disclosure provides composite materials containing electrically and ionically conducting polymers. As used herein, the term "derivative" when used with respect to a specific electrically or ionically conducting polymer refers to any chemical derivative of that polymer that retains the ability to conduct electrons or ions, respectively. Encompassed within the meaning of "derivative" are those derivatives that reduce, but do not eliminate the conductivity of the polymer. In some embodiments, derivatives of a polymer include compounds formed by functionalizing the polymer with one or more hydroxyl, halo, alkyl, cycloalkyl, heterocyclyl, aryl, heteroaryl, amine, or other functional groups. In some embodiments, derivatives include compounds formed by adding one or more optionally substituted methylene groups between an $sp^3$ hybridized carbon atom and another atom. In some embodiments, derivatives of a polymer include compounds formed by functionalizing the polymer with one or more hydroxyl, halo, alkyl, cycloalkyl, heterocyclyl, aryl, heteroaryl or amine functional groups. In some embodiments, derivatives of a polymer include compounds formed by functionalizing the polymer with one or more hydroxyl, halo, alkyl, or cycloalkyl functional groups. In some embodiments, derivatives of a polymer include compounds formed by functionalizing the polymer with one or more hydroxyl or alkyl functional groups. In some embodiments, PEDOT derivatives include polyers comprising a repeat unit according to formula (I), such as poly 2,3-dihydrothieno[3,4][1,4]dioxin-2-yl methanol (PEDOT-$CH_2$—OH), and poly 3,4-dihydro-2H-thieno[3,4-b][1,4]dioxepin-3-01 (PropOT). In some embodiments, PEO derivatives include polymers comprising a repeat unit according to formula (II), such as PPO.

A "phase", as used herein, refers to a physically distinct region of a composite or mixture, as between a hydrophobic and a hydrophilic phase. Phases may be distinct on a macroscopic level, or may be commingled, as in a dispersion or a colloidal system. A phase may be "continuous", which term is art-recognized, and means that the material that makes up the phase is continuously or functionally interconnected throughout the composite or mixture.

Numerical values, where provided, are understood to be approximate, and will be understood by those of skill on the art, depending on the context, to include values in a range around the specific numerical value listed, for instance by plus or minus 5%, or plus or minus 10%.

EXEMPLIFICATION

The invention now being generally described, it will be more readily understood by reference to the following examples which are included merely for purposes of illustration of certain aspects and embodiments of the present invention, and are not intended to limit the invention.

Example 1: Synthesis of Materials

PEDOT:PSS was purchased from Ossila Ltd. under the trade name Heraeus Clevios™ PH 1000, which came as a 1.0-1.3 wt % (1:2.5 PEDOT:PSS ratio) aqueous dispersion. PEO (MW=5 MDa, "PEO-5M") was purchased from Sigma Aldrich and was dissolved in distilled water by heating and stirring to make a 0.01 g mL$^{-1}$ 50/50 v/v water/methanol solution. Desired proportions of the PEDOT:PSS and PEO stock solutions were combined and mixed using a vortex mixer. Solutions could be cast onto the desired substrate (glass, conductive glass, metal spacers) and dried at room temperature overnight, followed by an additional 4 hr at 100° C. under vacuum. The conventional electrode matrix consisting of CC-binder was fabricated by combining Super P (Alfa Aesar) with PVDF (Alfa Aesar) in a 2:1 ratio with N-methylpyrrolidone (NMP) to form a solution of the same weight percent as the polymer mixtures herein, followed by 20 min pulsed ultrasonication (Misonix).

Example 2: Physical Characterization

Figure 8:
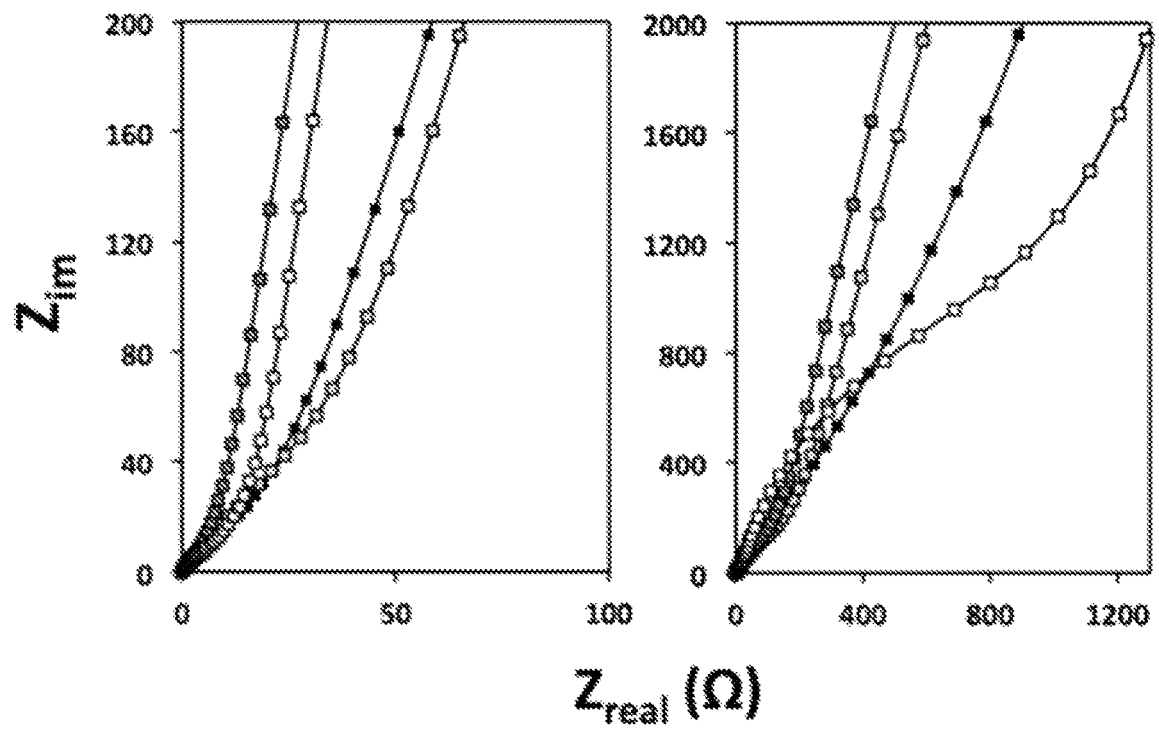
FIG. 8 includes two panels. Each panel shows a plot of the imaginary part of the impedance as a function of the real part (Nyquist plots) for the composite materials. The plots were obtained by electrochemical impedance spectroscopy for PEDOT-PEO polymer composites. Left: PEDOT:PSS (black fill), PEO:PEDOT 4:1 (light grey fill), 20:1 (dark grey fill), 85:1 (white fill). Right: PEO:PEDOT 0.5:1 (black fill), 1:1 (light grey fill), 2:1 (dark grey fill), 300:1 (white fill).

Electronic conductivity was measured on samples on glass pieces using a Signatone S3042 four point probe with Keithley SCS4200 current source and voltage measurement digital interface, and calculated using the standard equation (1), $$\sigma=1/[(\pi/\ln(2))\times(V/I)\times t] \qquad (1)$$

where $\sigma$ is the conductivity; V/I is the inverse slope of the resulting I-V curve by applying current, I, across the outer two probes and measuring the voltage drop, V, between the inner two probes; and t is the film thickness. Ionic conductivity was measured on samples cast on a 1 cm$^2$ masked area of conductive glass electrode pieces ("TEC 15", Hartford Glass Inc., Hartford, Ind.). Sample electrodes were placed in an open electrochemical cell containing 0.5 M LiClO$_4$ in propylene carbonate to mimic the inert electrolyte used in LIB cells, with the working electrode lead attached to the exposed conductive glass, and reference/counter electrode lead attached to an epoxy-sealed platinum foil. The cell was connected to a Solartron 1255B frequency response analyzer, and was oscillated with a 10 mV ac perturbation (no dc control) from 10$^5$-10$^{-1}$ Hz. The ionic resistance was deduced from the width of the 45° high-frequency region of the resulting Nyquist plots (FIG. 8) between the high- and (extrapolated) low-frequency intercepts ($Z_{real}$), and accounting for electrode area (A) and thickness (t), calculated from eqn (2).

$$\sigma = t/(3(Z_{real(low)} - Z_{real(high)}) \times A) \quad (2)$$

Film thicknesses were measured using a Dektak 150 Surface Profiler. Transmission electron microscopy (TEM) images were taken from a FEI Tecnai $G^2$ Spirit Twin at 120 keV accelerating voltage with a Gatan CCD camera. TEM samples were prepared by casting thick films of polymers and cutting them into small pieces with a razor blade, which were then glued onto a stub head. The stub was placed in a Leica UC7 ultramicrotome with FC7 cryochamber accessory. Glass knives were cut with a Leica EM KMR3 Knife Maker. The chamber, knife, and sample were allowed to equilibrate to −45° C. (near the glass transition temperature for PEO) for 15 min before advancing the knife stage at the sample. The sample was rocked at a rate of 0.1 cm $s^{-1}$, and the knife was advanced to cut 40 nm thick slices. Sample flakes were collected from the knife edge using a loop with water, followed by subsequent deposition onto lacey carbon/copper grids (Ted Pella). Atomic force microscopy (AFM) images were gathered on a Veeco Nanoscope V with a Dimension 3100 D3005-1 detector using a Bruker cantilever (k=40 N $m^{-1}$) in tapping mode at 4 min $s^{-1}$ scan rate. Differential scanning Calorimetry (DSC) thermograms were collected on a TA Instruments Discovery calorimeter from 25° C.-225° C. in aluminum T-zero pans. Wide-angle x-ray diffraction (WAXD) samples were prepared by casting materials on glass pieces, and were measured on a Bruker D8 General Area Detector Diffraction System (GADDS) with a 0.5 mm collimator.

Example 3: Electrochemical Characterization

Samples were assembled into cathodes using CR2016 coin cell parts (Pred Materials International, Inc. New York) by casting 0.5 mL sample solutions onto coin cell spacers directly. Spacers were dried overnight at room temperature, followed by drying for 4 hr at 100° C. under vacuum. Spacers were assembled into coin cells in an argon glove box (MBRAUN) with Celgard 2400 polyethylene separator and 1 M $LiPF_6$ in 1:1 ethylene carbonate/dimethyl carbonate solvent electrolyte system (BASF), in the order of: 20 μL electrolyte, separator, 20 μL electrolyte, separator, 20 μL electrolyte, followed by a lithium metal counter electrode (0.75 mm thickness, 99.9%, Alfa Aesar). Galvanostatic cycling was carried out on a Solartron 1470E battery cycler, allowing charging for 12 hr/5 V and indefinite discharge time to 1.5 V. Cyclic voltammetry (CV) was performed on the coin cells using a EG&G Princeton Applied Research 263A potentiostat from 1.5 V to 4 V at a scan rate of 0.1 mV $s^{-1}$. All potentials reported herein are relative to Li/$Li^+$.

Example 4: Charge Transport Properties

Figure 2:
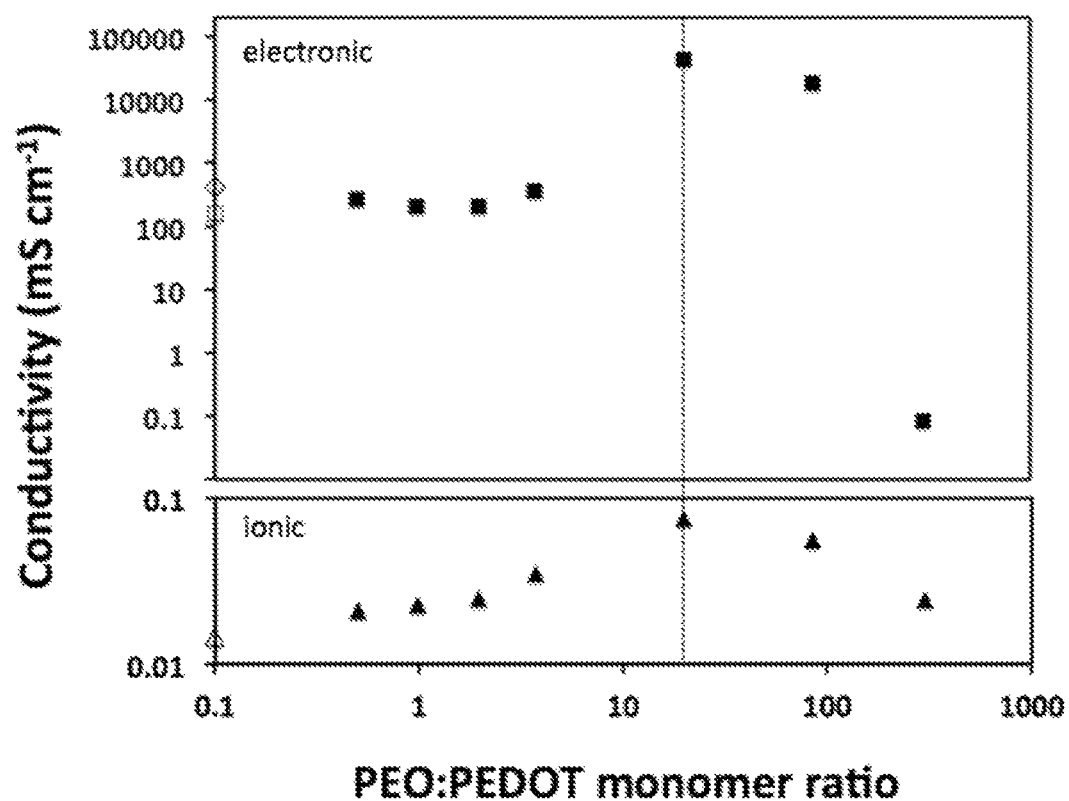
FIG. 2 is a plot of conductivity of a composite material described herein as a function of PEO:PEDOT monomer ratio. Squares and circles represent electronic conductivity; and triangles represent ionic conductivity. The data points represent materials having the indicated PEDOT-PEO polymer composite ratios (black), PEDOT:PSS (open circle/open triangle). 2:1 Super P-PVDF (open square) is used as a control.

It was expected that blending a conductor and an insulator for a given carrier will lower the conductivity of the other carrier. PEO and PEDOT:PSS were combined in varying molar (based on monomer) ratios from 0.5 to 300 PEO:PEDOT from their aqueous solutions. Upon vigorous mixing, the homogeneous aqueous solutions could be easily cast onto the desired substrate under ambient conditions. A library of varying PEO:PEDOT composites were cast on conductive and non-conductive glass to measure the ionic conductivity by electrochemical impedance spectroscopy (EIS) and electronic conductivity by four point probe, respectively. The values obtained are shown in FIG. 2. The ionic conductivity was calculated from the resulting Nyquist plots (FIG. 8) using an established EIS model for mixed ionic-electronic conductors, which assumes the electronic conductivity is significantly greater than the ionic conductivity. According to FIG. 2, this assumption is valid, and therefore it is reasonable to consider the values calculated from the EIS method reflect only ion transport. While $ClO_4^-$ is also present in the test electrolyte, it is expected to be repelled by the large amount of negatively charged PSS immobilized in the polymer matrix, and so it is assumed that $Li^+$ will be the dominant charges transported in this material. The ionic conductivity of pure PEDOT:PSS is measured to be 0.01 mS·$cm^{-1}$, which is comparable to known $Li^+$ conductors, likely due to the wet conditions employed in this experiment. No other studies were found that analyzed $Li^+$ transport in PEDOT. When PEO is incorporated, the ionic conductivity steadily increases, and peaks at 0.08 mS $cm^{-1}$ for the 20:1 PEO:PEDOT monomer combination. This ratio amounts to 64 wt % PEO, and is in good agreement with reported values for pure PEO in its conductive state. However, beyond this point, the conductivity is not proportional to the amount of PEO present, as the value declines for higher loadings. The 300:1 PEO:PEDOT composite is 97 wt % PEO, and thus the ionic conductivity with a large presence of PEDOT:PSS is greater than nearly pure PEO under the same conditions.

Figure 9:
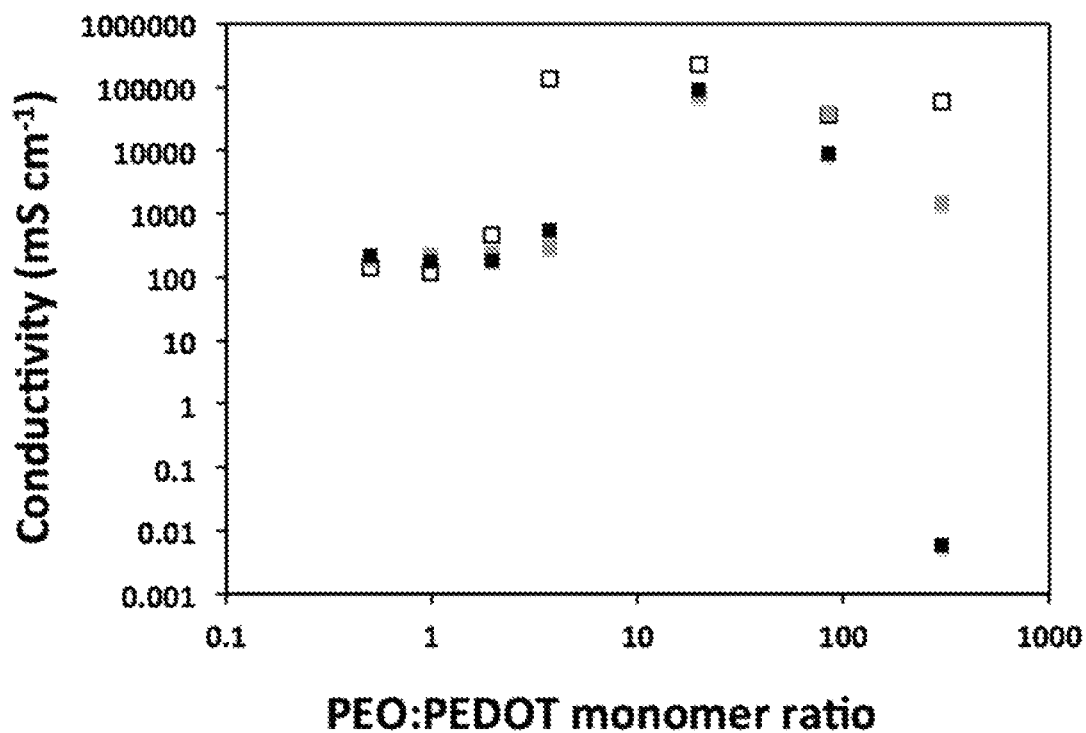
FIG. 9 is a plot of conductivity as a function of the monomer ratio in the composite material. The plot represents electronic conductivity of varying PEDOT-PEO polymer composite ratios made with other molecular weights of PEO: 400 Da (white fill), 4 kDa (grey fill), 400 kDa (black fill).

The electronic conductivity of pure PEDOT:PSS was found to be 0.42 S·$cm^{-1}$, which is in good agreement with literature reports. A standard conductive binder mixture, Super P CC and PVDF structural polymer, were cast from a 2:1 ratio in NMP and the material was found to have a lower electronic conductivity than pure PEDOT:PSS. As PEO is incorporated with PEDOT:PSS, it is logical that the electronic conductivity will decrease as the concentration of PEDOT decreases, diminishing continuous transport pathways. However, the conductivity is practically unaffected when PEO:PEDOT <10:1. When the ratio increases to 20:1, the electronic conductivity surges to nearly 50 S $cm^{-1}$, an increase of more than 2 orders of magnitude. The conductivity decreases by half but remains within this range when the ratio is yet again increased to 85:1, which yields a material that contains 89 wt % electron-insulating PEO. It is not until the PEO loading is increased to 97 wt % (only trace amounts of PEDOT) that the conductivity decreases by 5 orders of magnitude (<0.1 mS $cm^{-1}$). This trend is reproducible for other molecular weights of PEO (400 kDa, 4 kDa, and 400 Da-liquid at RT) (FIG. 9). This finding surprisingly contradicts a previous result that shows a quasi-linear increase to electronic conductivity with increasing PEDOT:PSS in a PEO host matrix. This electronic conductivity for the 20:1 composite is improved by 2.5 orders of magnitude compared to the conventional matrix material (0.16 S·$cm^{-1}$). Therefore, both the ionic and electronic conductivities are maximized at the 20:1 (64 wt %) PEO:PEDOT ratio. These measurements quantify the optimal values and expose a non-intuitive trend of improved ionic and electronic conductivity with a large proportion of PEO incorporated, which is highly desirable in a dual conductive material.

Example 5: Morphological and Structural Analysis

The 20:1 polymer composite possesses attractive but unexpected properties. Therefore, it is critical to understand the resulting structural features underlying the observed trends and enhanced functionality; specifically, why $Li^+$ transport is higher in PEDOT-PEO than pure PEO and why electron transport is improved when less electronic conductor is present. FIGS. 3A-3D show transmission electron microscopy (TEM) and atomic force microscopy AFM (phase) imaging performed on composites of varying PEO:PEDOT ratios in order to extricate the morphological structure of the blends that might be responsible for transport phenomena.

Figure 3A:
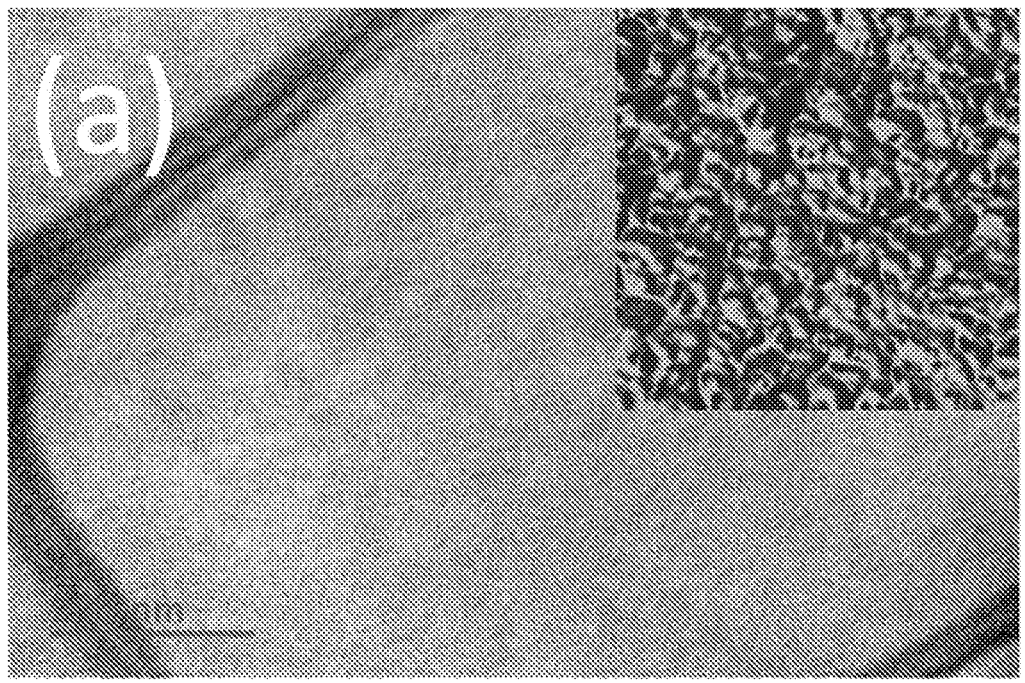
FIGS. 3A-3D show TEM images with inset AFM-phase images (1 $\mu m^2$) of various composites.

PEDOT:PSS shows obvious phase separation using both techniques, indicating that although electrostatically bound, the PEDOT and PSS have unfavorable mixing parameters and form ~100 nm globular-shaped conductive and non-conductive domains (FIG. 3A). This morphology is in agreement with previous studies and has been interpreted as conductive PEDOT globular domains encapsulated in a PSS matrix, where the conductive and non-conductive domains appear as bright and dark regions in AFM imaging, respectively. Conversely, the more electron-absorbing PEDOT represents the dark areas in the case of TEM imaging. The concentration of PEDOT domains is sufficient for forming long-range pathways for conductivity throughout bulk films.

Figure 3B:
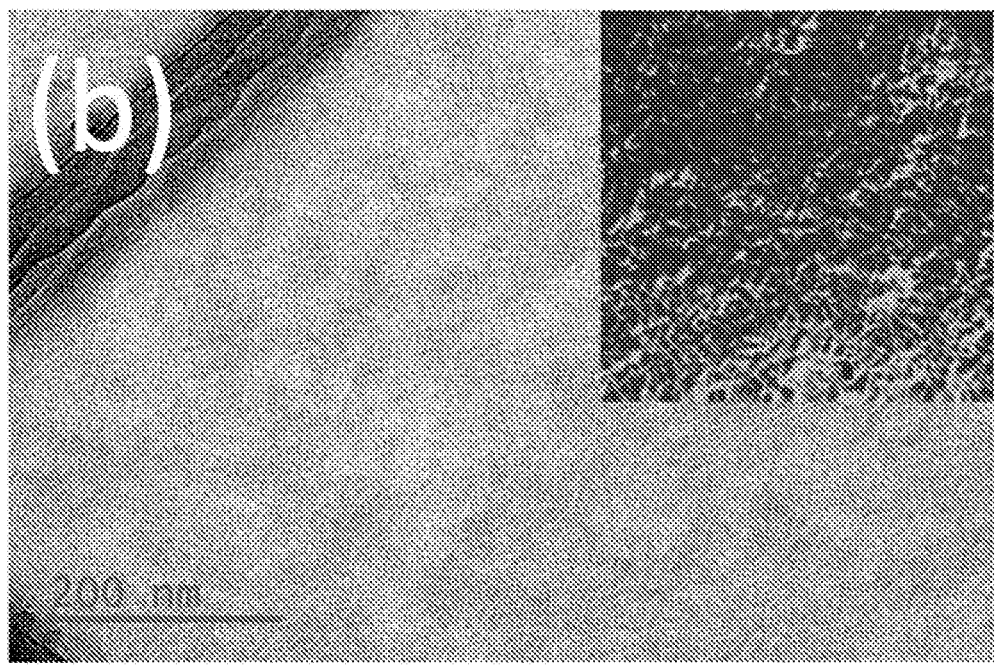
Figure 3C:
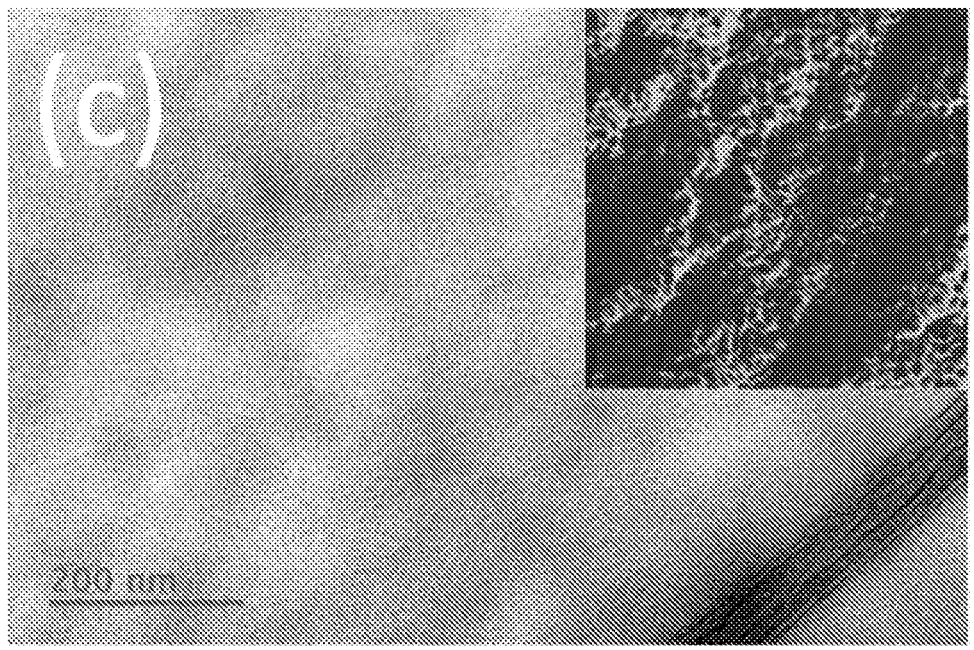
Figure 3D:
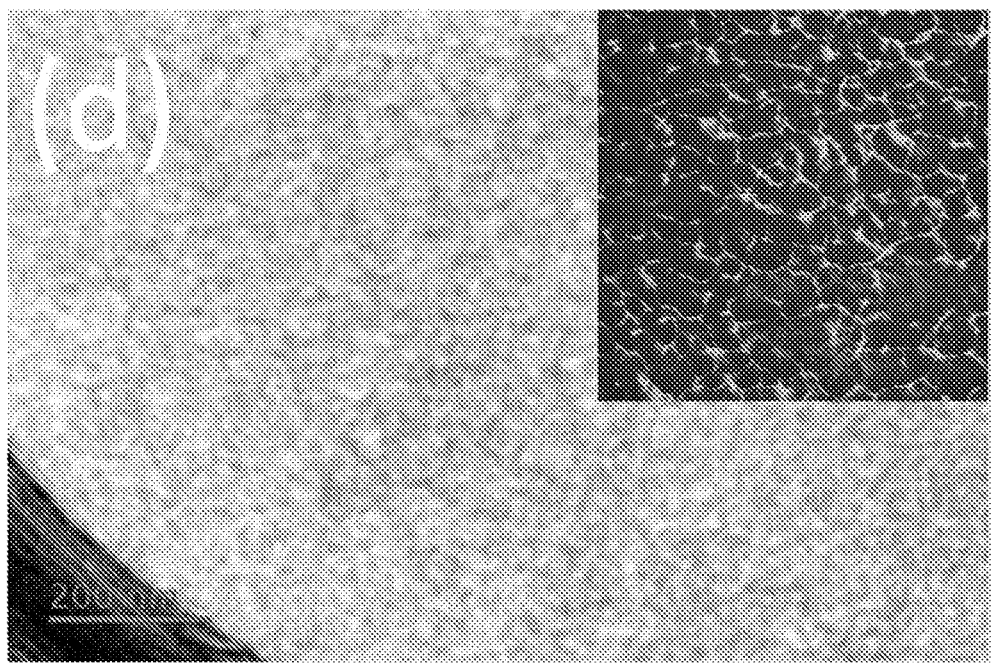

Upon introduction of 25 wt % PEO, light (dark) regions in the TEM (AFM) expand, and occupy a greater amount of space (FIG. 3B). This is the PEO favorably associating with the PSS-rich phase, which is expected given their similar solvation properties and potential for favorable ion-dipole interactions. These features are extended when PEO is loaded to 64 wt % (FIG. 3C), the ratio giving the highest electronic and ionic conductivities. While the presence of the PEDOT phase noticeably diminishes as PEO is added, its domains are denser and more interconnected than pristine PEDOT:PSS. This is especially evident in the 20:1 composite, where PEDOT ultimately forms a webbed morphology throughout the frame examined. Despite the low concentration of PEDOT, this structure forms a continuous phase, i.e., a completely connected pathway for the flow of charge. Additionally, greater intensity observed qualitatively in TEM for the PEDOT domains at these concentrations suggest denser and therefore more efficient packing of PEDOT chains, which will also lower flow resistance. When PEO is loaded to a 85:1 ratio (89 wt %), the PSS-PEO phase dominates (FIG. 3D). While there is a clear shift to a more disperse morphology in the TEM image, the AFM image shows that the remaining PEDOT is further densely packed into a thin yet highly continuous web morphology. However, compared to the 20:1 composite, the web structure is more branched, and, due to the very low PEDOT concentration, more branch termini are present. These images illustrate that interconnected phase domains are present even at the lowest weight fractions of PEDOT, resulting still in enhanced conductivity, although reduced compared to the highly continuous morphology of the 20:1 composite.

Figure 4A:
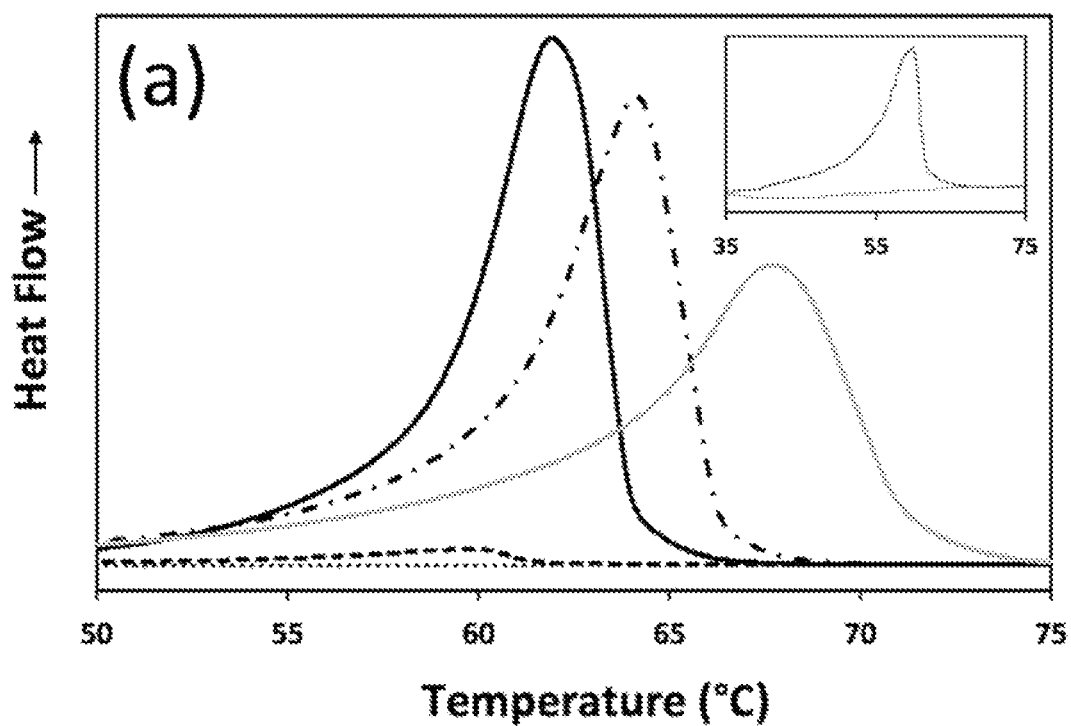
FIG. 4A shows differential scanning calorimetry (DSC) thermograms of PEO:PEDOT 4:1 (dotted line), 20:1 (dashed line), 85:1 (solid line), 300:1 (dash-dotted line) polymer composites, and PEO-5M (grey line) (inset: magnification of 4:1 and 20:1 composite).
Figure 4B:
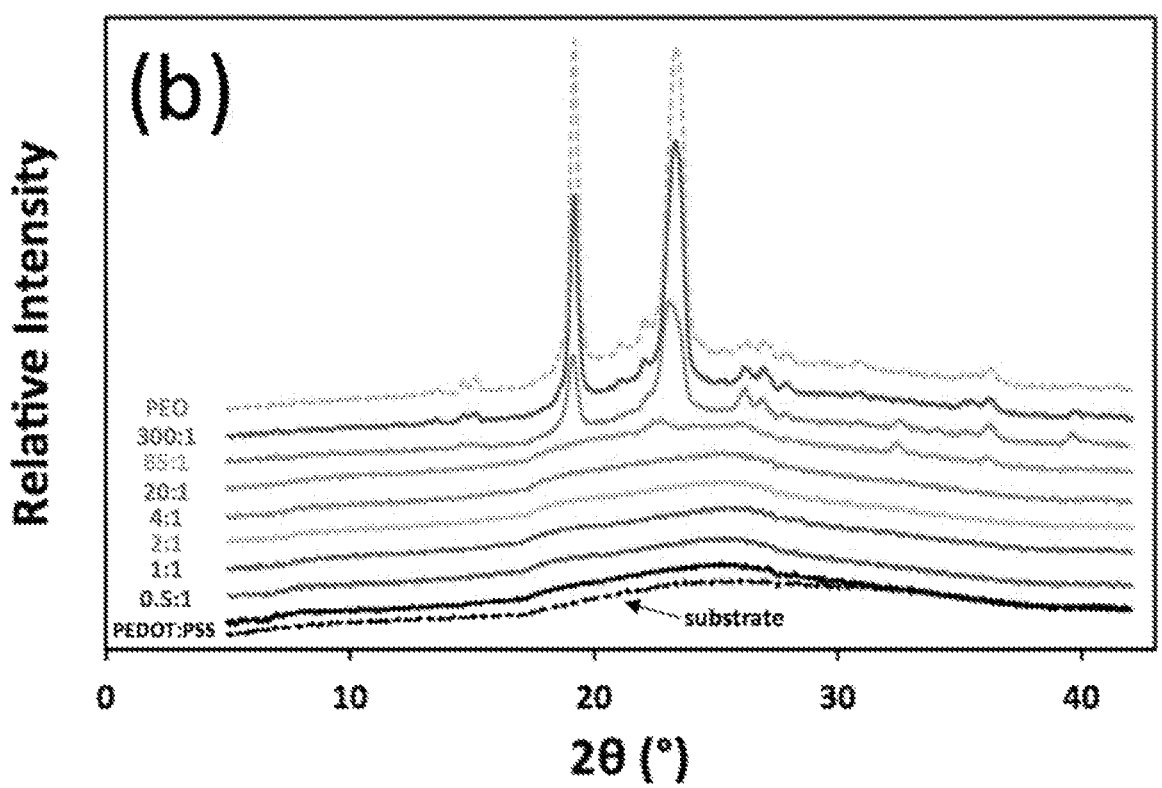
FIG. 4B shows wide-angle x-ray diffractograms of polymer composites of the indicated compositions.

Along with morphological domain structure, the degree of crystallinity strongly impacts the ion conductivity of PEO. This semi-crystalline polymer has a low glass transition temperature well below room temperature, but is typically highly crystalline in the neat form at room temperature, with a melting point of about 60° to 70° C. To gain further insight into the structure-function relationship, thermal analyses and x-ray diffraction were performed to determine the impact to the crystallinity and melt behavior of the resulting composite by blending with PEDOT:PSS (FIG. 4). Differential scanning calorimetry (DSC) thermograms (FIG. 4A) were used to determine the (peak) melting temperatures ($T_m$) (Table 1). PEO-5M has a measured ($T_m$) of 67.7° C., which is in agreement with the literature value. Upon blending, $T_m$ steadily decreases in correlation with the amount of PEDOT:PSS, ultimately to 59.9° C. for the 20:1 composite. This is a meaningful drop in melt point and is anticipated due to blending of PEO with PSS chains. PEDOT:PSS alone does not exhibit features in its thermogram as it is fully amorphous, which is in agreement with previous analyses.

TABLE 1

Thermal properties of Polymer Composites

| PEO:PEDOT monomer ratio | PEO content (wt %) | $T_m$ (° C.) | Crystallinity change (%) |
|---|---|---|---|
| PEO-5M | 100 | 67.7 | — |
| 300:1 | 97 | 64.2 | +6.5 |
| 85:1 | 89 | 61.9 | +15.1 |
| 20:1 | 64 | 59.9 | −95.3 |
| 4:1 | 25 | — | 100 |

It can therefore be inferred that PEDOT:PSS destabilizes the intermolecular forces that drive crystallization because it interferes with PEO-PEO chain interactions. This is in agreement with the above morphology experiments, which determined that PSS interacts distinctly with PEO due to more favored thermodynamic solvation properties. This disruption to the thermal stability of the PEO matrix by PEDOT networks is likely responsible for the decrease $T_m$.

Because the composite consists of amorphous and crystalline components, the crystallinity of PEDOT-PEO composites was calculated from the heat of fusion ($\Delta H_f$) values for melting events in the thermograms (FIG. 4A), shown in Table 1. Because there is a discrepancy for standard heat of fusion ($\Delta H_f^\circ$) given a strong dependence on molecular weight, the values here are calculated using PEO-5M as a standard. When PEDOT:PSS is present in small quantities (3 wt % and 11 wt % for the 300:1 and 85:1 composites, respectively), the PEO crystallinity is actually greater than pure PEO, which is the result of the measured values of $\Delta H_f$ being larger than PEO. This implies that although the melt point is depressed, there is increased ordering within the phase-segregated domains that are formed in the interconnected morphologies at intermediate concentrations. Thus, more overall energy is required to fully melt the material, which strongly suggests that different intermolecular forces are introduced. Given previous evidence in this report, it is likely that these are strong interactions between PEO and the introduced PSS, even at these small concentrations. This is supported by the fact that the larger crystallinity resides with the 85:1 composite compared to the 300:1 composite, which contains less PEDOT:PSS. When additional PEDOT:PSS is introduced, the crystallinity is drastically reduced (to 95% for the 20:1 composite, which still contains 64 wt % crystallizable PEO). This suggests that there is a change in the nature of the PEO-PSS interaction, leading to very low crystallinity in a composite containing a highly crystallizable polymer. This finding is consistent with a previous report of crystallinity depression with low molecular weight PEO crosslinked to PSS in a similar composite. These observations are supported using wide angle x-ray diffraction (WAXD) (FIG. 4B), which shows that the 20:1 ratio is the onset of observable crystallinity, given the formation of peaks near 23°, 26°, 32° and 36°, which coincide with peaks for pristine PEO. Composites of lower ratios (more PEDOT:PSS-like) than the 20:1 composite exhibit only an amorphous shoulder between 17° and 30°, while composites of ≥20:1 ratio contain correlating peak intensities characteristic of pristine PEO superimposed on the amorphous shoulder. From this trend, it can be inferred that composites <20:1 are entirely amorphous and so loadings at least as high as 25 wt % PEO contain all amorphous PEO content trapped in the PSS domains, as observed in the TEM and AFM micrographs in FIG. 3. This is also supported by the DSC thermograms, which show no $T_m$ peak for composites <20:1 (FIG. 4A). For composites ≥20:1, an increasing excess of PEO crystallizes within the blend as the concentration of PSS decreases and PEO is in excess. This mechanism is in agreement with the more isolated domains observed for the 85:1 composite in the TEM micrograph in FIG. 3D, and resembles the formation of spherulites in PEO-containing blends reported previously.

Of the composites examined, both the transport properties and structure of the 20:1 (64 wt %) ratio are the most interesting, since this combination yields both the highest electronic and ionic conductivity and possesses a structure that is nearing the point of crystallization of PEO. It is apparent that the presence of PEO is necessary to enhance conductivity, but only in the amorphous phase, where PEO and PSS interact strongly and independently of PEDOT. Above the saturation point, the formation of PEO crystals (and lack of critical PEDOT concentration) diminishes the conductive properties. This strongly implies that efficient transport pathways for both electronic and ionic conductivity are dependent on the presence of a polymer that can facilitate interactions between PEO and PEDOT, such as PSS, as well as the thermodynamically agreeable solvation properties between PEO and PSS. In terms of electron transport, their interaction drives dense and highly molecularly aligned webbed PEDOT domains, despite a lower concentration of PEDOT. The enhanced ionic conductivity must then be related to the PEO-PSS domain. The $Li^+$ conductive properties of PEO have been attributed to the amorphous regions of its secondary structure, which allow chain flexibility so that oxygen lone pairs on its backbone can interact with $Li^+$.[23] This amorphous character is typically very limited at room temperature in the absence of chemical modification. Therefore, superior $Li^+$ transport is obtained by the PEO-PSS interaction leading to an amorphous state, until the onset of crystallization (>20:1), when the ionic conductivity begins to decrease (in FIG. 2). The trends observed in these DSC and WAXD experiments were also all consistent with the same experiment performed using composites containing different molecular weights of PEO (400 Da, 4 kDa, 400 kDa) (not shown).

Example 6: Electrochemical Analysis

To test the performance of the PEDOT-PEO composite under electrochemical conditions (redox cycling), specifically as a cathode in a lithium-based cell, the 20:1 (64 wt %) PEO material was incorporated in CR2016 coin cells with lithium metal as the counter/reference electrode, and standard lithium electrolyte (1 M $LiPF_6$ in 1:1 ethylene carbonate/dimethyl carbonate) with polyethylene separator. While battery performance for different binder materials is typically studied in the context of active materials, this work concentrates on the electrochemical behavior of PEDOT-PEO alone in order to isolate its behavior during the charging and discharging processes. The pernicious environment of a lithium cell, including harsh solvents, high potentials, reactive salts and exhaustive charge movement throughout cycling, are taxing on the electrode materials. Conducting polymers, in particular, are already known to undergo unfavorable processes at even modest potentials in aqueous conditions, including overoxidation, whereby electrochemical degradation of the polymer leads to loss of electronic conductivity. Of this family, PEDOT is known as the most stable, although reports have shown its degradation in similar conditions. Therefore, it is critical to examine the response of the PEDOT-containing composite in specific LIB conditions.

Figure 10:
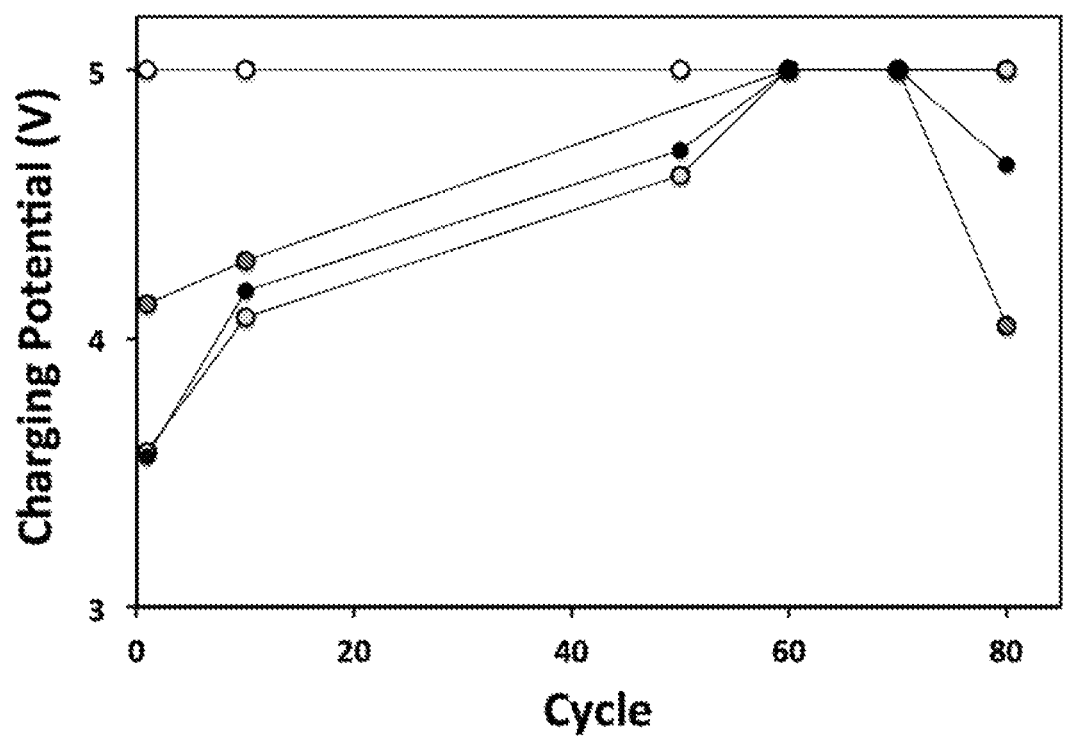
FIG. 10 is a plot of the charging potential as a function of the cycle number, representing maximum potential achieved in 12 hour charge time as a function of cycling for CR2016 lithium coin cells containing PEO-5M (no fill), PEDOT:PSS (dark grey fill), polymer composite (64 wt % PEO) (light grey fill), and 2:1 Super P-PVDF (black fill) electrodes. Note the y-axis is on a logarithmic scale.

Lithium coin cells with various electrode materials were cycled between 1.5 and 5 V, the two extremes of all potential anodic and cathodic storage materials (graphite and $LiCoPO_4/Li_xNi_{0.5}Mn_{1.5}O_4$, respectively), which is a larger window than is typically examined in the literature. The resulting curves for the tenth cycle are shown in FIG. 5B. Cells were allowed 12 hr to charge up to 5 V and infinite time to discharge to 1.5 V at 1 mA $g^{-1}$. Because dual conductors are likely to be incorporated into electrochemical systems in a passive (e.g. non-redox) role, figures of merit such as charge capacity and faradaic efficiency for charge storage purposes are unimportant. However, here these measurements are useful indicators of electrochemical stability in a lithium cell environment. The PEDOT-PEO composite exhibits a charge-discharge trace that is qualitatively a compromise between PEO, which displays negligible Li capacity, and PEDOT:PSS, which contains a slight discharge plateau that indicates charge storage in the electroactive thiophene backbone of PEDOT (FIG. 10). The capacity of the composite is approximately 40% that of pure PEDOT:PSS, which is in agreement with the PEDOT:PSS concentration in this material (36 wt %).

Figure 5A:
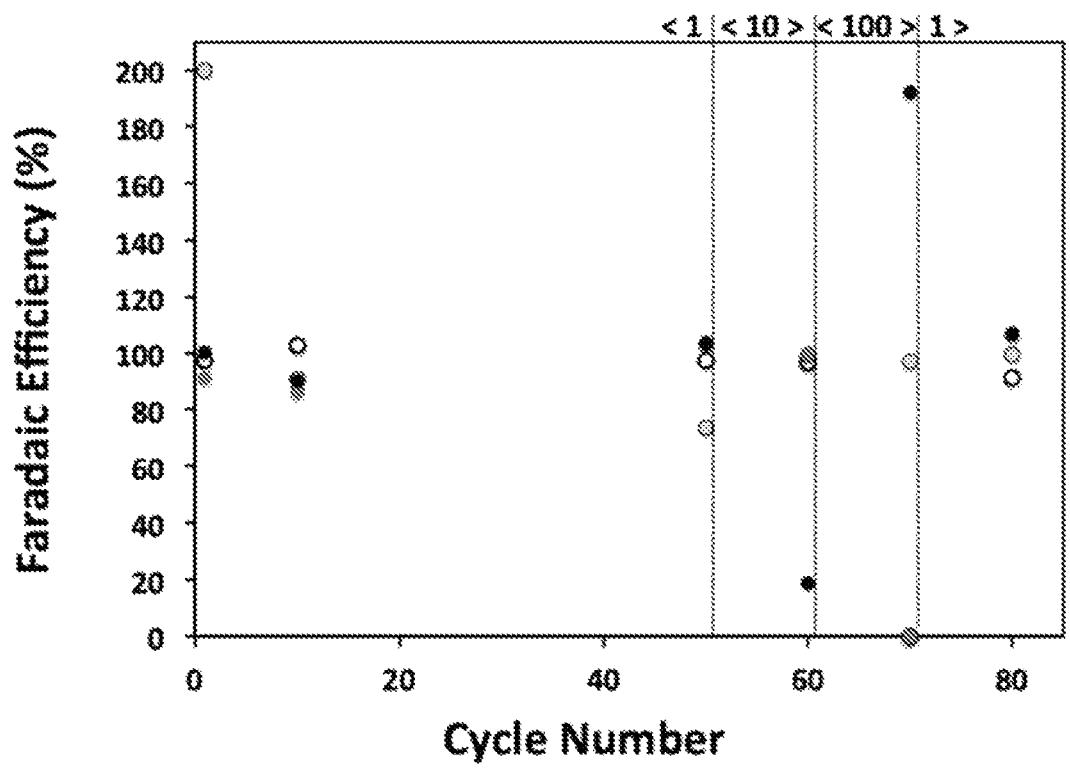
FIG. 5A is a plot of the faradaic efficiency as a function of cycle number at varying rates (in mA $g^{-1}$) for CR2016 lithium coin cells containing PEO-5M (open circle), PEDOT:PSS (light grey circle), polymer composite (64 wt % PEO) (dark grey circle), and 2:1 Super P-PVDF (black circle) electrodes.
Figure 5B:
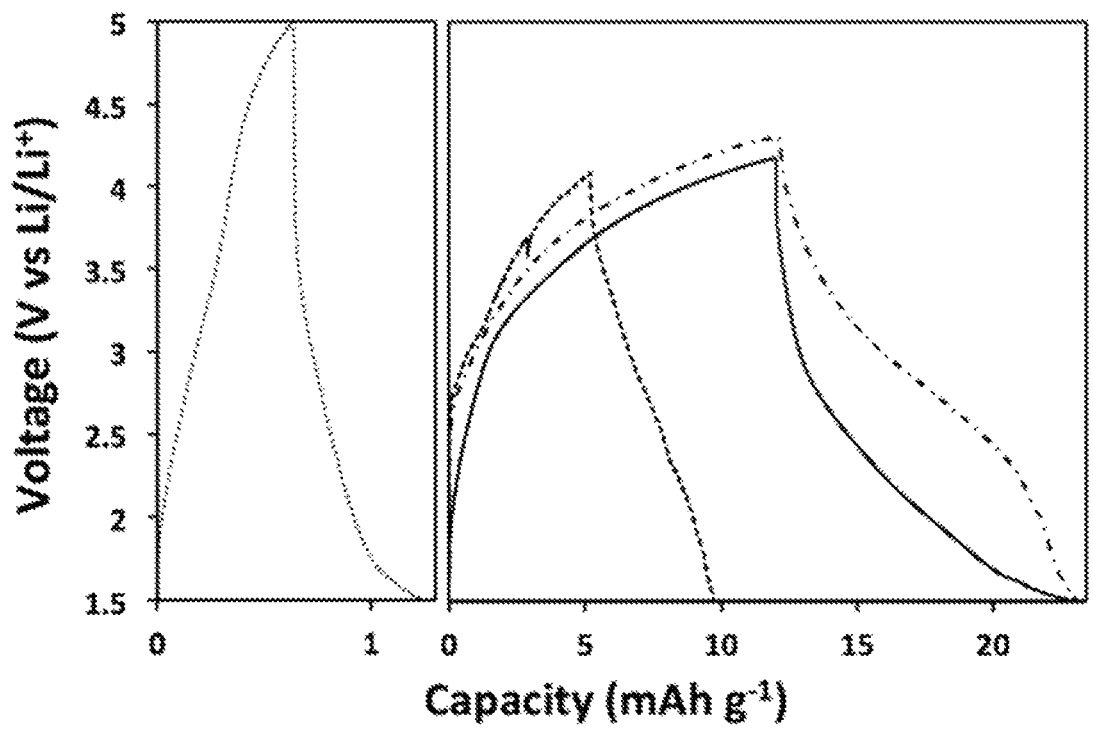
FIG. 5B is a plot of voltage as a function of capacity representing the galvanostatic charge-discharge cycles for CR2016 lithium coin cells containing PEO-5M (left, grey), PEDOT:PSS (right, dash-dotted line), polymer composite (64 wt % PEO) (right, dotted line), and 2:1 Super P-PVDF electrodes (black solid line) at 1 mA $g^{-1}$ total material.
Figure 5C:
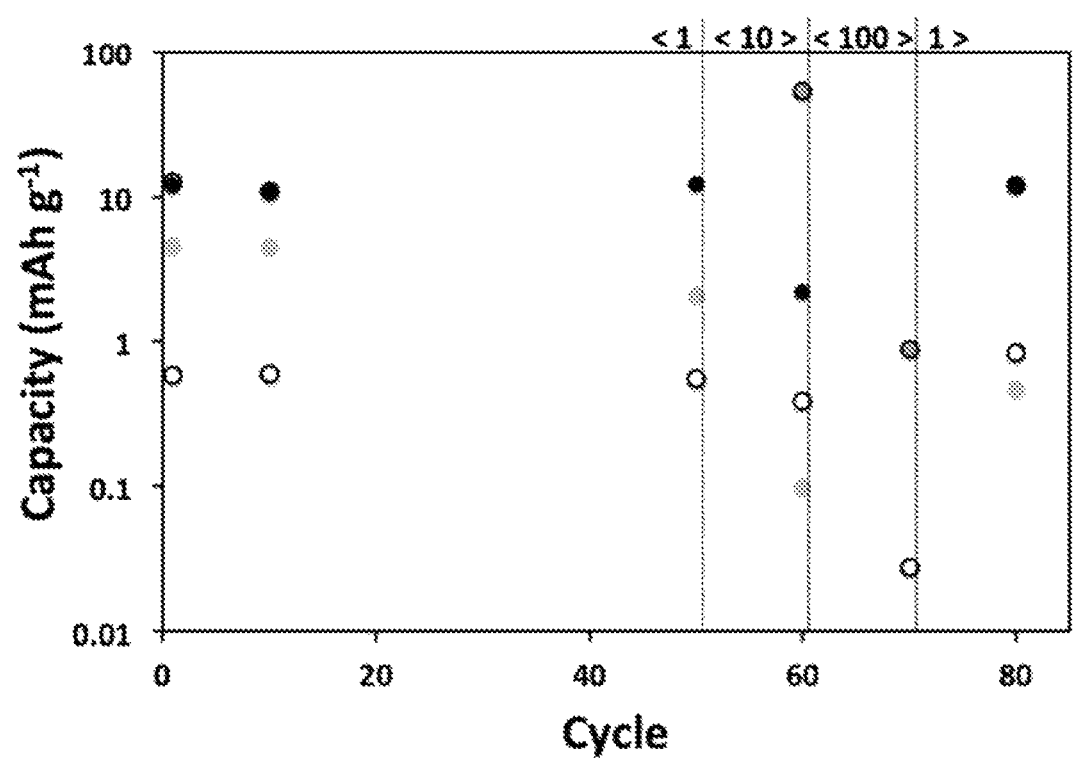
FIG. 5C is a plot of capacity as a function of the number of cycles representing the discharge capacity for CR2016 lithium coin cells containing PEO-5M (open circles), PEDOT:PSS (solid circles, dark grey fill), polymer composite (64 wt % PEO) (light grey circles), and 2:1 Super P-PVDF (black circles) electrodes. Note the y-axis is on a logarithmic scale.

The faradaic efficiency of the composite, its parent materials, and conventional binder system (2:1 Super P-PVDF) as a function of cycling was measured in order to reveal electrochemical stability (FIGS. 5A-C). Initially cycling slowly at 1 mA $g^{-1}$, both the conventional binder and PEO are near-unit efficiency. Neat PEDOT:PSS has a measured efficiency of 200%, suggesting that degradative processes are occurring to the conjugated backbone under the highly oxidative conditions, resulting in freed charges being introduced to the cell. The composite has an initial efficiency of ~90%, which implies a different mechanism of degradation associated with its PEDOT content resulting in charge lost. Upon further cycling, PEDOT:PSS has <100% efficiency, going as low as 74% after 50 cycles at 1 mA $g^{-1}$, implying a change in degradation mechanism to side reactions that result in a loss of charges. In contrast, PEO and the composite stabilize to near 100% efficiency, which is unexpected due to the reported instability of PEO at high potentials, and that the composite contains a large amount of susceptible PEDOT:PSS. When the rate is increased to 10 mA $g^{-1}$, the polymer materials unexpectedly possess near-unit efficiency, and it is not until a rate of 100 mA $g^{-1}$ is applied that both the PEO and composite exhibit immeasurable cycling (extremely rapid charge and discharge). However, this does not mean that parasitic side reactions are occurring that irreversibly degrade the materials. Even after fast cycling, PEDOT:PSS ceases to continue degradation, suggesting that the material reaches a stable state, with most of its conjugation (and therefore conductivity) intact, as its capacity does not fade considerably after this cycling treatment. The conventional binder material undergoes very significant side reactions in response to the higher rates, with a low efficiency (19%) at 10 mA $g^{-1}$ and >100% efficiency (192%) at 100 mA $g^{-1}$, implying different modes of degradation that result in diminished and added charges to the cell, respectively. Upon returning to the initial rate of 1 mA $g^{-1}$, all materials tested show near-unit efficiency, signifying that side reactions cease.

Figure 5D:
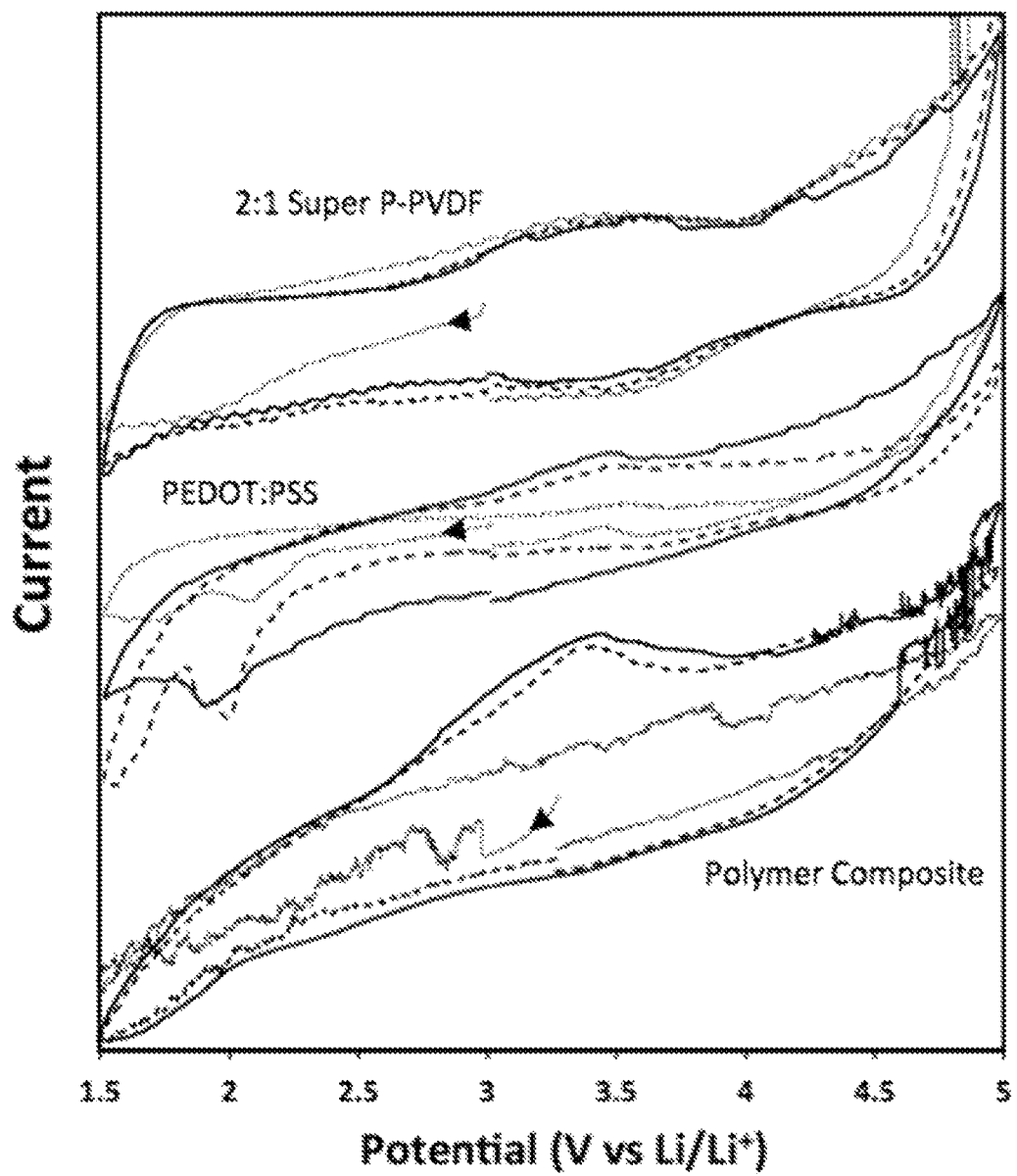
FIG. 5D is a plot of the current as a function of potential representing cyclic voltammograms (0.1 mV $s^{-1}$) of CR2016 lithium coin cells containing the 2:1 Super P-PVDF conventional matrix, pure PEDOT:PSS, and the polymer composite (64 wt % PEO). The 1st (dotted line), 3rd (dashed line), and 5th (solid line) cycles are shown.
Figure 6:
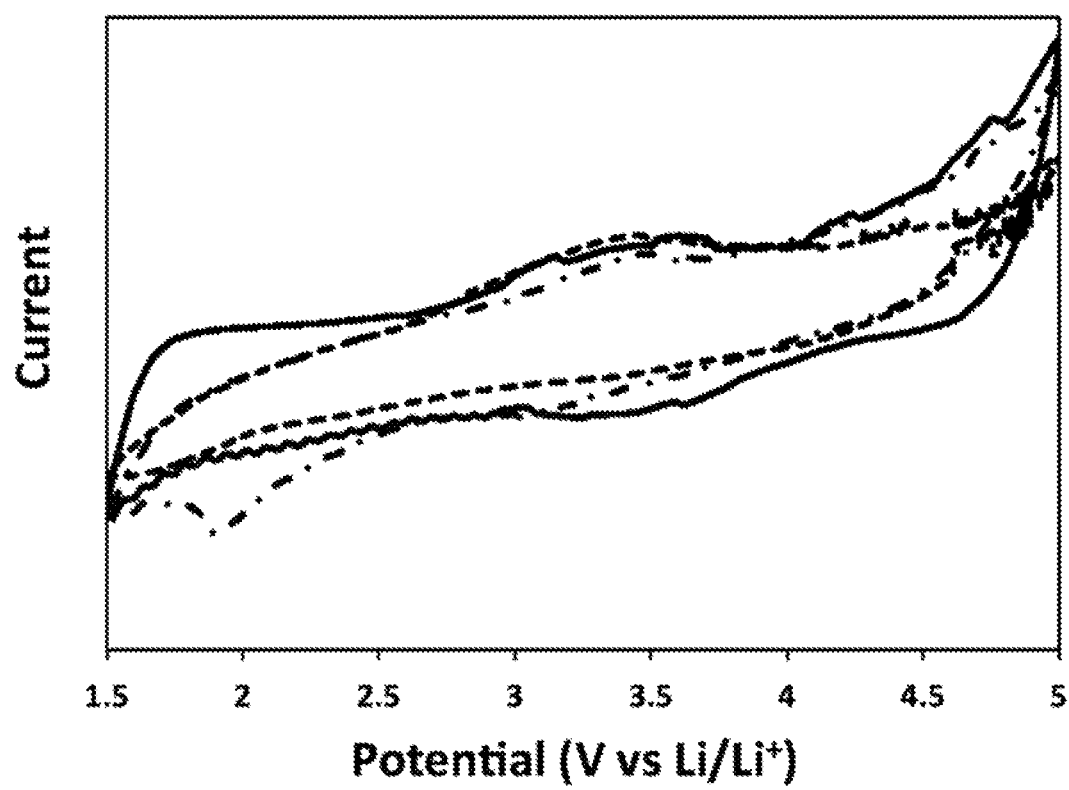
FIG. 6 is a plot of the current as a function of the potential representing the fifth cycle of cyclic voltammograms (0.1 mV $s^{-1}$) of CR2016 lithium coin cells containing the 2:1 Super P-PVDF conventional binder (solid line), pure PEDOT:PSS (dash-dotted line), and the polymer composite (64 wt % PEO) (dashed line).
Figure 11:
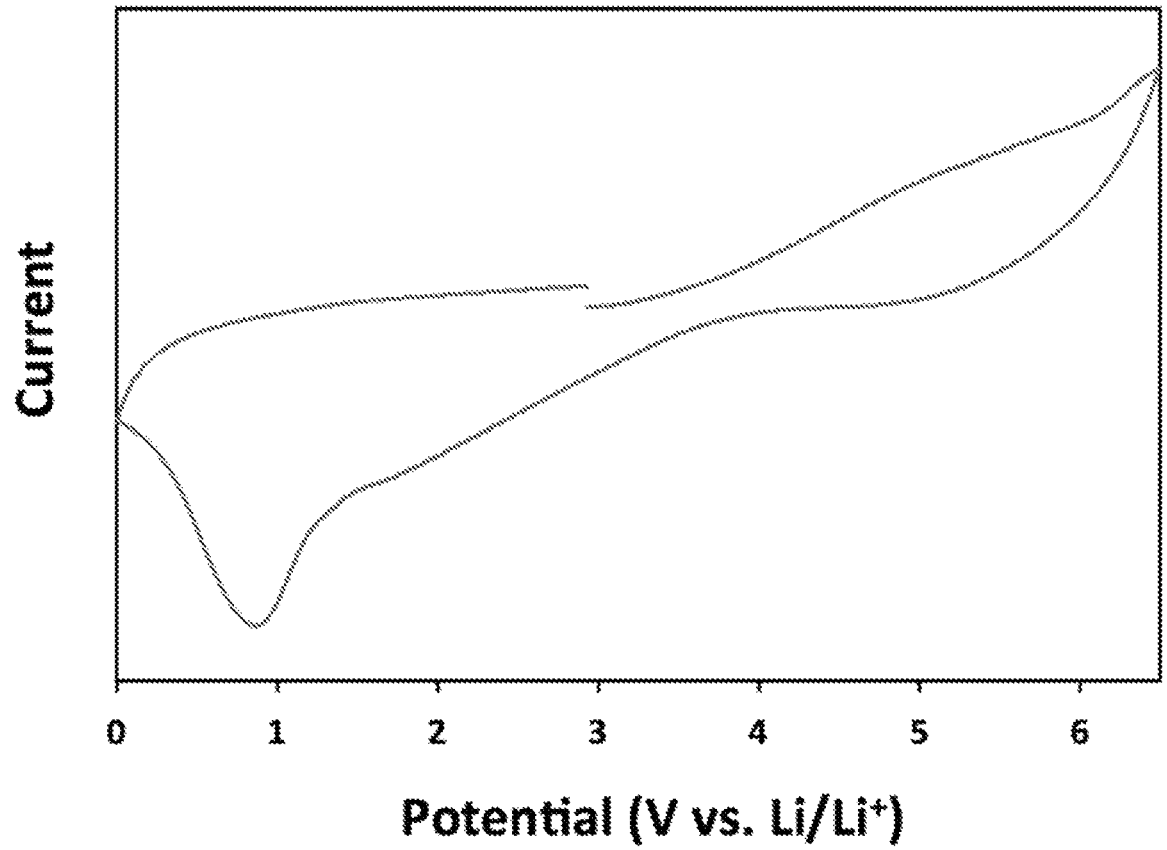
FIG. 11 is a plot of the current as a function of potential representing a cyclic voltammogram of 20:1 PEDOT-PEO cycled in a larger potential window than that in FIG. 6, at a scan rate of 50 mV s$^{-1}$.

To more closely examine electrochemical events, cyclic voltammetry (CV) was performed on fresh cells at a rate of 0.1 mV s$^{-1}$. The resulting current response as a function of applied potential is shown in FIG. 6. The conventional matrix material possesses electroactive character from its capacitive-like trace. This is expected, since the CC Super P is similar to graphite, which is very commonly used as a storage material in LIB anodes and therefore would participate in the electrochemical intercalation/deintercalation processes. The CV for this material exhibits minimal charging/discharging peak separation between 2.7-3.7 V, which presumably indicates the lithium charge transfer between the material and lithium metal electrodes. PEDOT:PSS displays good stability in the presence of electrolyte at high potentials. The charging peak occurs at the same potential (3.5 V) as the Super P-PVDF, which is presumably plating of lithium onto the counter electrode. The peak that evolves at 2 V can therefore be associated with intercalation of Li$^+$ into PEDOT. This potential is 1.5 V lower than the opposing process, which suggests that the conducting polymer facilitates charge transfer with less overpotential. This is attributable to superior conductive pathways compared to CC electronic transport. With the addition of significant amounts of PEO in the polymer composite, erratic behavior is observed at potentials greater than 4.3 V. This can potentially be attributed to PEO, which was shown to have stability issues at potentials greater than 4 V. This was not observed in FIG. 5, and so might be the result of rearrangement to the polymer matrix rather than side reactions. The discharge peak is not observable in this voltage window, and was found to occur at an even lower potential than 1.5 V, see FIG. 11, signifying that the superior ionic and electronic transport pathways of the composite result in lower discharge overpotentials. This suggests that this dual conductor will result in improved power density in Li-based electrochemical devices.

The rate capability (discharge capacity values as a function of cycle and rate) of these cells are summarized in FIG. 5B. The cell potentials obtained upon charging for 12 hr do not reach 5 V initially except for pure PEO-5M, but increase as a function of cycle and reach 5 V at 10 and 100 mA g$^{-1}$ in all cases, with the potential again decreasing upon returning down to 1 mA g$^{-1}$ (except for PEO-5M) (FIG. 10). When cycling at low rate (1 mA g$^{-1}$), the capacity does not change significantly for any of these materials (note that in this range, the light grey points for PEDOT:PSS are hidden behind the black points for Super P-PVDF). Upon holding the cells to 10 mA g$^{-1}$ for 10 additional cycles, pure PEDOT:PSS actually displays an increased capacity. However, upon observing all cycling curves collected, the capacity and attainable voltage for this sample fluctuate considerably compared to the 1 mA g$^{-1}$ cycling regime, indicating that the material is still equilibrating under conditions where current is being passed. All other materials display a decreased capacity, which is expected for batteries in general, as increased polarisation limits accessible lithiation sites. The observation is further amplified when the rate is increased another order of magnitude, where capacities for pure PEO and PEDOT:PSS decrease by one order of magnitude, and the capacities for the composite and conventional matrix are immeasurable. Upon returning to the low rate of 1 mA g$^{-1}$ for a final 10 cycles to check the reversibility of the materials after harsh conditioning, it can be seen that PEO, PEDOT:PSS and Super P-PVDF (again superimposed) return to near their initial capacity under these conditions. However, the capacity of the polymer composite has been reduced to that similar to PEO despite no considerable effects to the constituent materials.

The faradaic efficiency as a function of cycling was also derived from the charge-discharge charts, with the results plotted in FIG. 5C. The efficiency is a measure of how much charge is recovered compared to how much is applied, and is an indicator of material suitability in a battery setting in terms of performing the desired processes when passing current in either direction. Initially, most materials are near unit efficiency when cycling at low rate, although there is a significant decrease to 85-90% after the first 10 cycles. Because the efficiency is <100%, this typically indicates that alternative processes are occurring during charging, as discharge of intercalated Li$^+$ alone does not account for the charge put in. Since the positive electrode (i.e. the materials undergoing testing) is being oxidized during charging, the undesired electrochemistry taking place on the conjugated PEDOT backbone described herein and elsewhere may be responsible for the lower efficiency for the pure conducting polymer sample and the composite. For the conventional matrix, CC is also electroactive, and so it is possible that undesired processes such as the formation of the solid electrolyte interface (SEI) known for anode storage materials occurs in these conditions to cause the drop in efficiency.[43] The effect on the composite is observable earlier and more intensively, which implies that the inclusion of significant PEO (shown to be relatively electrochemically stable) has a destabilizing effect. Ironically, this is perhaps due to its structure favoring efficient electron and ion shuttling that these undesired processes may be carried out to a greater degree. After 50 cycles, the efficiencies do increase, except for the composite, which drops to 40%. Again, this is likely due to processes occurring to PEDOT (50$^{th}$ cycle not shown), as the efficiency for pure PEDOT:PSS is also heavily decreased after 10 cycles at 10 mA g$^{-1}$ following. Because the decrease is observed earlier, this further evidences the undesired reactivity is accelerated in the more conductive composite. At this point, and even following cycling another order of magnitude higher at 100 mA g$^{-1}$, all materials continue or return to near unit efficiency, indicating that after modest cycling the materials have equilibrated and cease the potentially deleterious processes. The polymer composite is capable of withstanding the onerous demands of galvanostatic cycling in an LIB environment while maintaining its function of charge transport comparable to the conventional matrix used in commercial LIBs.

To more closely examine the electrochemistry occurring in these cells upon charge-discharge, CV was performed on fresh cells. Cells were cycled in 2-electrode mode similar to the preceding galvanostatic experiment at a scan rate of 0.1 mV s$^{-1}$, comparable to the 1 mA g$^{-1}$ predominantly used there. The resulting current response as a function of applied potential is shown in FIG. 5D. It can be seen that the conventional matrix material possesses electroactive character from its capacitive-like trace. This is expected, since the CC Super P is not unlike graphite, which is very commonly used as a storage material in LIB anodes, and therefore would participate in the electrochemical insertion/deinsertion processes.[44] Also like LIB electrodes, the electrochemistry is highly reversible over the cycling window examined, as evidenced by the minimal charging/discharging peak separation around 3.5 V (which presumably indicates the lithium insertion-deinsertion process for both the tested material and lithium metal electrodes) and the lack of change between cycles. There is erratic behavior in the first cycle >4.7 V that stabilizes in subsequent cycles, which may be attributed to the common side reactions such as SEI formation and other structural rearrangements that were responsible for the decreasing capacity and faradaic efficiency in FIGS. 5B and 5C, respectively.

Figure 7:
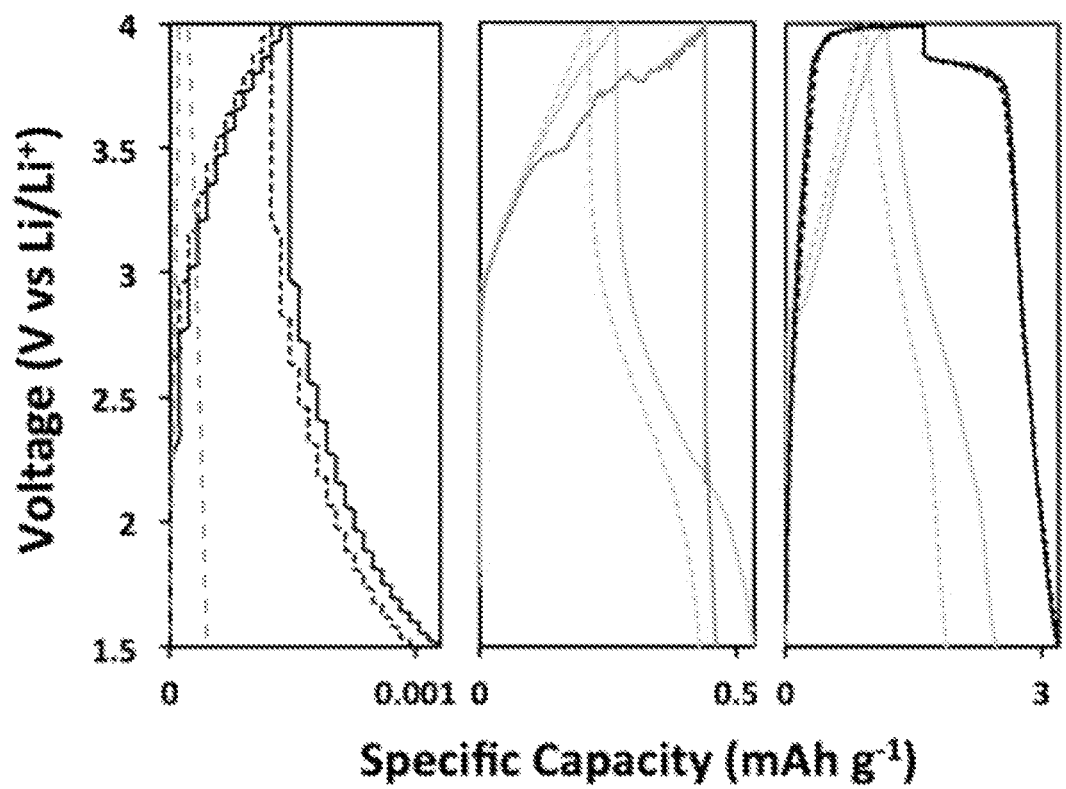
FIG. 7 shows three panels, each representing a plot of voltage as a function of specific capacity for the $1^{st}$ (solid) and $10^{th}$ (dashed) cycle of CR2016 lithium coin cells containing LCO in a conductive binder matrix at C/1000 (0.1 mA $g^{-1}$ LCO). The right panel contains results for 85:15 weight ratio LCO:matrix electrodes: 2:1 Super P-PVDF (black) and polymer composite (64 wt % PEO) (light grey). The middle panel contains results for 95:5 weight ratio LCO:matrix electrodes: PEDOT:PSS (dark grey) and polymer composite (64 wt % PEO) (light grey). The left panel contains results for 95:5 weight ratio LCO:matrix electrodes: 2:1 Super P-PVDF (black) and PEDOT:PSS (dark grey).

The current response for PEDOT:PSS is erratic in the LIB cell compared to open cell conditions. This is especially true for its first cycle, and the trace changes through the third cycle before stabilizing by the fifth cycle (later cycles are practically superimposed—not shown). This equilibration process suggests that the oxidative side processes indicated by lower efficiency values in FIG. 7 (and exhibited by increasing current onset at 4.2 V in FIG. 8, which disappears in later cycles) are equilibrative in nature rather than harmful to the overall polymer properties in these conditions. This experiment proves that PEDOT has good stability in an LIB environment, surviving the rigor of high potentials in inert electrolyte. The redox peaks (insertion/deinsertion) are separated by about 1.5 V. Since the charging peak occurs at the same potential (3.5 V) as the Super P-PVDF, this potential likely reflects plating of lithium onto the counter electrode and not any unique electrochemistry associated with deinsertion in the materials investigated. Therefore, the peak that evolves at 2 V is associated with insertion of $Li^+$ into PEDOT. This potential is 1.5 V lower than the opposing process, which suggests that the conducting polymer is not only involved in storage but does so with less overpotential. This can be attributed to more facile insertion in the conducting polymer, and the superior conductive pathways compared to CC electronic transport.

With the addition of significant amounts of PEO in the polymer composite, very erratic behavior is prevalent in the initial cycle, and while subsequent cycles indicate equilibration, later cycles continue to display this at potentials >4.3 V. This can potentially be attributed destabilization by presence of PEO, which was shown to have reaction efficiency issues under these conditions in FIG. 5C in early cycles and has previously been reported to have electrochemical stability issues at potentials >4 V; although, it is not clear this will have an effect on transport properties, and FIG. 6 indicates overall electrochemical stability over longer cycling periods. The lithium plating/desertion peak has a much larger relative area compared to the other materials, implying that the onset of lithium plating occurs at a slightly lower potential and at a greater rate, which may be due to the enhanced $Li^+$ conductivity of the PEO in addition to the electronic conductivity of the conducting polymer. The reverse (lithiation) peak upon discharge to 1.5 V is not observable in this voltage window, and occurs at an even lower potential (FIG. 11), signifying that the superior ionic and electronic transport pathways of the composite result in lower charging overpotentials.

Example 7: Incorporation of Storage Materials

Thus far, the polymer composite has been tested against its parent conducting polymer and conventional CC LIB matrix in the absence of the electrode storage materials, which will make up the bulk of the electrodes and whose electrochemical properties will be enabled by the supportive matrix material used. Now that the characteristics of the matrix materials have been carefully determined under LIB conditions, it is important to understand how well they interact with the workhorse storage material and how they function in a predominantly supportive role. LCO is the most common commercially utilized LIB cathode, and so was used as a model for characterizing the matrix with storage material incorporated.

The desired mass of LCO powder was added to the matrix slurry and vigorously mechanically mixed. Just as in the preceding experiments described, the electrodes were cast directly onto coin cell spacers and made into CR2016 lithium cells. Due to stability issues for LCO, the cells were galvanostatically cycled up to only 4 V, for 10 cycles, in order to compare the attainable capacities. Samples were made with an 85:15 ratio of LCO to matrix material (which, for the conventional matrix, amounts to 10:5 Super P to PVDF), which is a typical recipe for commercial LIBs.[46] The results for cycling at C/1000 (0.14 mA $g^{-1}$) are shown in FIG. 9 and quantified in Table 2.

TABLE 2

Electrochemical performance of LIBs

| Matrix Material | LCO:Matrix (wt) | Cycle # | Faradaic Efficiency (%) | Discharge Capacity [mAh $g^{-1}$] |
|---|---|---|---|---|
| 2:1 Super P-PVDF | 85:15 | 1 | 98 | 1.58 |
|  |  | 10 | 99 | 1.60 |
| 20:1 Polymer Composite | 85:15 | 1 | 108 | 1.27 |
|  |  | 10 | 98 | 0.93 |
| 2:1 Super P-PVDF | 95:5 | 1 | 120 | 0.0006 |
|  |  | 10 | 140 | 0.0006 |
| PEDOT:PSS | 95:5 | 1 | 5 | 0.02 |
|  |  | 10 | 95 | 0.00007 |
| 20:1 Polymer Composite | 95:5 | 1 | 100 | 0.27 |
|  |  | 10 | 101 | 0.22 |

While the desired outcome for improving transport properties of LIB electrodes is increasing the overall capacity by increasing the amount of storage material that can be implemented, the specific capacity is of interest here. This will allow for observation of how the efficacy of the storage material is affected when lesser amounts of matrix material to transport charge is present. The conventional LIB (85:15 LCO:Super P/PVDF) initially has a specific capacity of 1.6 mAh $g^{-1}$ (FIG. 7, right panel), which is lower than the theoretical value of 137 mAh $g^{-1}$ (only about half can be discharged under these safer voltage conditions; the full value is 274 mAh $g^{-1}$). This can possibly be due to straying from standard electrode manufacturing methods, including slurry viscosity, casting conditions, special annealing, and calendaring; nonetheless, all electrodes were made using the same methods so as to be comparable in experiments conducted herein. After 10 cycles, the capacity does not change significantly, which is expected since this recipe has proven optimal for commercial manufacture. For the same LIB replaced with the PEDOT-PEO composite, despite the improved electronic and ionic conductivity of the polymer composite matrix, the capacity decreases by 20% to 1.3 mAh $g^{-1}$ (right panel). This indicates that under the present simple fabrication methods used, the LCO-matrix interaction is lacking compared to the conventional recipe. This is also evident in the shape of the voltage curves, for which the polymer composite system resembles the curve for PEDOT-PEO without LCO in FIG. 5B. Whereas, when LCO is present, the curve for the conventional matrix is transformed from a potential decay to a high-potential (3.7-3.8 V) plateau, consistent with typical behavior for LIB electrodes.

While the conventional system is superior to the polymer composite at 85% storage material, it is limited by this value; otherwise, commercial LIBs would maximize capacity by increasing storage material loading without deterioration to the cycling response. In this work, we hypothesize that the continuousness of conducting ($e^-$ and $Li^+$) polymers throughout the electrode bulk compared to CC percolation networks will result in a reduced requirement for the amount of matrix relative to storage material, thereby increasing the nominal capacity. To test the capability of the matrix to accommodate increased storage material, LCO was incorporated in a ratio of 95:5 and fashioned into LIBs, and tested in the same manner as the 85:15 cells. It is worth noting that the applied current is specific to the storage material loading, and so higher rates are used for higher storage material loadings. Since LIBs are designed to maximize capacity, the very low specific capacity (0.0006 mAh g$^{-1}$) for this highly loaded conventional cell (left panel) compared to the optimized 85:15 regime used commercially is expected. The same LIB made with PEDOT:PSS replacing Super P-PVDF has a higher capacity of 0.02 mAh g$^{-1}$ (middle panel) due to the superior electron transport networks of a conducting polymer compared to the percolation-based networks of CC composites. However, this cell is still unsatisfactory, as the capacity decreases to a negligible value after 10 cycles. This initial improvement is in agreement with previous work (although with lower values), where the electronic properties of PEDOT:PSS improved the capacity of LiFePO$_4$ electrodes, but only when included in sufficient quantities, much like the conventional system. Here, however, the voltage drop off is very steep and faradaic efficiency is extremely low, implying that undesired processes are occurring at the storage material-matrix interfaces that proves to be deleterious.

While there is some improvement at high LCO loading by including more efficient electron transport, it is possible that the process is limited by Li$^+$ transport. When the PEDOT-PEO composite, with both electron and lithium-conducting components, is substituted, the specific capacity increases to 0.27 mAh g$^{-1}$, more than an order of magnitude higher than with PEDOT:PSS. In addition, unlike the PEDOT:PSS version, after 10 cycles the capacity drops by only 20% and not to precarious levels. This indicates that the PEDOT-PEO composite allows for a larger loading of storage material (95:5), allowing for higher capacity LIBs. Additionally, the general shape of the curve is maintained, with good faradaic efficiency and a discharge plateau that implies normal lithiation is occurring, permitted by the enhanced transport by the mixed conductor polymer composite.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A composite material for an electrode, comprising a polymer matrix, the polymer matrix comprising:
   a first phase, the first phase comprising an electrically conductive polymer, wherein the first phase is substantially continuous; and
   a second phase, the second phase comprising an ion-conducting polymer, and
   wherein the molar ratio of the ion-conducting polymer to the electrically conductive polymer based on monomer content is between about 10:1 and 85:1; and
   wherein the electrically conductive polymer is poly(3,4-ethylenedioxythiophene)(PEDOT) and the ion-conducting polymer poly(ethylene oxide) (PEO).

2. The composite material of claim 1, further comprising a surfactant.

3. The composite material of claim 2, wherein the surfactant is a polymeric surfactant.

4. The composite material of claim 3, wherein the surfactant is poly(styrene sulfonate) (PSS).

5. The composite material of claim 1, further comprising a particulate active material.

6. The composite material of claim 5, wherein the active material is selected from a cathodic active material or an anodic active material.

7. The composite material of claim 6, wherein the active material comprises lithium metal or a lithium compound.

8. The composite material of claim 7, wherein the active material is lithium cobalt oxide (LCO), lithium nickel cobalt manganese oxide (NCM), lithium nickel cobalt aluminum oxide (NCA), lithium iron phosphate (LFP), lithium titanium oxide (LTO), a lithium alloy, a lithium chalcogenide, a lithium halide, or a lithium polyanion.

9. The composite material of claim 6, wherein the active material comprises silicon or carbon.

10. The composite material of claim 1, wherein the polymer matrix comprises PEDOT, PEO, and PSS.

11. The composite material of claim 1, wherein the molar ratio of PEO to PEDOT based on monomer content is about 20:1.

12. An electrode comprising:
   a collector; and
   the composite material of claim 1, wherein the composite material is in electrical contact with a first surface of the collector.

13. The electrode of claim 12, wherein the composite material is disposed in a layer on the first surface.

14. The electrode of claim 13, wherein the layer has a thickness relative to the first surface of at least 10 μm.

15. The electrode of claim 14, wherein the layer has a thickness relative to the first surface of at least 100 μm.

16. The electrode of claim 13, wherein the layer has a thickness relative to the first surface of 10-1000 μm.

17. The electrode of claim 16, wherein the layer has a thickness relative to the first surface of 10-100 μm.

18. The electrode of claim 12, wherein the collector comprises a wire, and wherein the wire comprises the first surface of the collector.

19. An electrochemical energy storage device, comprising the composite material of claim 1.

* * * * *